United States Patent
Christmas

(10) Patent No.: US 11,592,664 B2
(45) Date of Patent: Feb. 28, 2023

(54) PUPIL EXPANDER

(71) Applicant: Envisics Ltd, Milton Keynes (GB)

(72) Inventor: Jamieson Christmas, Knowlhill (GB)

(73) Assignee: Envisics Ltd, Milton Keynes (GB)

( * ) Notice: Subject to any disclaimer, the term of this patent is extended or adjusted under 35 U.S.C. 154(b) by 183 days.

(21) Appl. No.: 17/034,776

(22) Filed: Sep. 28, 2020

(65) Prior Publication Data

US 2021/0165212 A1 Jun. 3, 2021

(30) Foreign Application Priority Data

Dec. 2, 2019 (GB) ..................................... 1917552

(51) Int. Cl.
*G02B 27/00* (2006.01)
*G02B 27/01* (2006.01)

(52) U.S. Cl.
CPC ..... *G02B 27/0081* (2013.01); *G02B 27/0093* (2013.01); *G02B 27/0101* (2013.01);
(Continued)

(58) Field of Classification Search
CPC ............ G02B 27/0081; G02B 27/0093; G02B 27/0101; G02B 27/0172;
(Continued)

(56) References Cited

U.S. PATENT DOCUMENTS

2006/0255243 A1  11/2006  Kobayashi et al.
2012/0224062 A1   9/2012  Lacoste et al.
(Continued)

FOREIGN PATENT DOCUMENTS

DE  102014206569 A1 * 10/2015 ............ B60K 35/00
EP    3570115 A1    11/2019
(Continued)

OTHER PUBLICATIONS

UKIPO Combined Search and Examination Report under Sections 17 & 18(3), GB Application No. 1917552.0, dated May 26, 2020, 5 pages.

*Primary Examiner* — Kimberly N. Kakalec
(74) *Attorney, Agent, or Firm* — McDonnell Boehnen Hulbert & Berghoff LLP

(57) ABSTRACT

There is disclosed herein a display device comprising a picture generating unit, a waveguide pupil expander and a viewer-tracking system. The picture generating unit comprises a first display channel, a second display channel and a controller. The first display channel is arranged to output first spatially-modulated light of a first colour. The first spatially-modulated light corresponds to a first picture. The second display channel is arranged to output second spatially-modulated light of a second colour. The second spatially-modulated light corresponding to a second picture. The controller is arranged to drive the first display channel and second display channel. The waveguide pupil expander comprises a pair of parallel reflective surfaces. The waveguide pupil expander defines an input port and a viewing window. The input port is arranged to receive the first spatially-modulated light and the second spatially-modulated light. The viewing window is an area or volume within which a viewer may view the first picture and the second picture. The pair of parallel reflective surfaces is arranged to guide the first spatially-modulated light and the second spatially-modulated light from the input port to the viewing window by a series of internal reflections. The reflectivity of a first reflective surface of the pair of parallel reflective surfaces is provided by a graded coating. The graded coating is partially transmissive to light of the first colour and light of the second colour. The transmissivity of the graded coating is non-achromatic. The viewer-tracking system is
(Continued)

arranged to determine a viewing position within the viewing window. The controller is arranged to maintain as substantially constant the colour balance of the first and second picture as seen from the viewing position based on the viewing position determined by the viewer-tracking system.

16 Claims, 17 Drawing Sheets

(52) U.S. Cl.
CPC .. *G02B 27/0172* (2013.01); *G02B 2027/0112* (2013.01); *G02B 2027/0174* (2013.01)

(58) Field of Classification Search
CPC .... G02B 2027/0112; G02B 2027/0174; G02B 27/0103; G02B 2027/0123; G02B 2027/0107; G02B 2027/0109; G02B 2027/0118
See application file for complete search history.

(56) References Cited

U.S. PATENT DOCUMENTS

| | | | |
|---|---|---|---|
| 2018/0348521 A1* | 12/2018 | Matsuki | G02B 27/142 |
| 2019/0196402 A1 | 6/2019 | Leister et al. | |
| 2019/0354069 A1 | 11/2019 | Christmas | |

FOREIGN PATENT DOCUMENTS

| | | | | |
|---|---|---|---|---|
| JP | 2006-317681 A | 11/2006 | | |
| JP | 2019-200410 A | 11/2019 | | |
| KR | 2019-0040310 A | 4/2019 | | |
| WO | 2015081313 A2 | 6/2015 | | |
| WO | WO-2017120320 A1 * | 7/2017 | ............. | B29D 11/00 |
| WO | 2018052862 A1 | 3/2018 | | |

* cited by examiner

PUPIL EXPANDER

CROSS-REFERENCE TO RELATED APPLICATIONS

This application claims the benefit of priority of United Kingdom Patent Application no. 1917552.0, filed Dec. 2, 2019, which is hereby incorporated herein by reference in its entirety.

FIELD

The present disclosure relates to a pupil expander such as a waveguide pupil expander. More specifically, the present disclosure relates to a multicolour waveguide pupil expander such as a waveguide pupil expander for two or three-colour display. The present disclosure also relates to a projector and a method of projection such as a holographic projection and a method of holographic projection. Some embodiments relate to a head-up display. Some embodiments relate to optimising image uniformity within a viewing window.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic display device, such as a holographic projector, may be provided using the system described herein. Such projectors have found application in head-up displays, "HUD".

SUMMARY

Aspects of the present disclosure are defined in the appended independent claims.

There is disclosed herein a display device comprising a picture generating unit, a waveguide pupil expander and a viewer-tracking system. The picture generating unit comprises a first display channel, a second display channel and a controller. The first display channel is arranged to output first spatially-modulated light of a first colour. The first spatially-modulated light corresponds to a first picture (or image). The second display channel is arranged to output second spatially-modulated light of a second colour. The second spatially-modulated light corresponding to a second picture (or image). The controller is arranged to drive the first display channel and second display channel. The waveguide pupil expander comprises a pair of parallel reflective surfaces. The waveguide pupil expander defines an input port and a viewing window. The input port is arranged to receive the first spatially-modulated light and the second spatially-modulated light. The viewing window is an area or volume within which a viewer may view the first picture/image and the second picture/image. The pair of parallel reflective surfaces is arranged to guide the first spatially-modulated light and the second spatially-modulated light from the input port to the viewing window by a series of internal reflections. The reflectivity of a first reflective surface of the pair of parallel reflective surfaces is provided by a graded coating. The graded coating is partially transmissive to light of the first colour and light of the second colour. The transmissivity of the graded coating is non-achromatic. The viewer-tracking system is arranged to determine a viewing position within the viewing window. The controller is arranged to maintain as substantially constant the relative brightness of the first and second picture as seen from the viewing position based on the viewing position determined by the viewer-tracking system.

The waveguide pupil expander comprises two reflective surfaces. One reflective surface—e.g. the first reflective surface—is partially transmissive and partially reflective. The partial transmissivity leads to the formation of replicas of the light rays received by the waveguide. The other reflective surface—e.g. the second reflective surface—of the waveguide is a perfect or near-perfect reflector—e.g. a perfect mirror. Spatially-modulated light is received at an input port of the waveguide. The waveguide may be substantially slab-shaped, wherein the separation of the two reflective surfaces is less than the dimensions of the two reflective surfaces. Each reflective surface is substantially planar. The waveguide is configured such that the viewer should look at the large surface of one of the reflective surfaces—e.g. the partially reflective surface. This surface may be referred to as the viewing surface. The input port may be on the same side of the slab as the viewer or it may be on the opposite side. The input port may comprise a break or gap in the reflective component—e.g. reflective layer or coating—of the fully reflective surface or the partially reflective surface. The input port may alternatively begin at the end of the reflective component.

The viewing window may be an eye-box or an eye-motion-box. The waveguide enlarges the viewing window due to the generation of extra rays by division of amplitude of the incident wavefront. In accordance with this disclosure, the incident light (that is, the light received by the waveguide) is spatially-modulated light. The spatially-modulated light may be encoded with a hologram of the picture or encoded with the picture itself. In either case, the incident light may be collimated.

Embodiments of the present disclosure relate to a multi-colour waveguide pupil expander. That is, a waveguide configured to perform pupil expansion of a first colour picture (that is, a first picture formed of light of a first wavelength) and a second colour picture (that is, a second picture formed of light of a second wavelength, wherein the first wavelength is different to the second wavelength). The system may be configured such that a first colour picture and second colour picture are perceived as substantially coincident at the viewing window in a manner familiar to the reader. For example, the system may form a full colour images by combining a plurality of single colour images such as red, green and blue images (herein called a "composite colour image/picture").

The first surface of the waveguide comprises a partially transmissive-reflective coating. The reflectivity of the coating is not constant along the length of the waveguide (in the general light propagation direction). However, for an optimal viewing experience, the brightness of each colour image should not change as the viewer moves around within the viewing window. Furthermore, the colour balance between the different single colour image components should remain constant. The coating may comprise more than 25 dielectric layers in order to provide the necessary optical performance at a plurality of wavelengths. Much effort can be devoted to optimising the coating but it is near impossible to provide an entirely achromatic coating.

The non-achromaticity of the first reflective surface/graded mirror results in an image having a colour balance that varies across the viewing window. The inventor has found that viewers are particularly sensitive to this type of imbalance—particularly in a real-world system in which viewing position is not steady such as head-up display. The inventor has devised an approach that compensates for an imperfect (i.e. non-achromatic) coating on the viewing surface/graded mirror. Notably, the inventor has appreciated the significance of the chromaticity being a sensitive function of viewing position. This sensitive dependence on position is a consequence of light guiding by internal reflection using a waveguide. Specifically, it is due to the perceived image being formed of different light rays at different viewing positions. These different rays may have experienced a different number of bounces (i.e. reflections) within the waveguide. The different rays will have followed different bounce paths within the slab and have therefore been reflected by different local areas of the graded coating. In accordance with the present disclosure, the position of the viewer within the viewing window is used to fine-tune the brightness of the individual single colour images in order to compensate for the chromaticity of the graded mirror. A viewer-tracking system is used as part of a feedback system. The viewer-tracking system may be an eye-tracking system or head-tracking system. Calibration data may be used to fine-tune the brightness of one or more of the single colour images in real-time in order to maintain colour balance. The calibration data may be obtained by a calibration process comprising measuring the relative brightness of each single colour image at a plurality of different viewing positions within the viewing window.

The waveguide replicates the rays of the incident wavefront in order to expand the viewing window/pupil. Each successive replica is formed by one more bounce of the light rays within the waveguide. The reflectivity/transmissivity of the viewing surface is therefore graded—that is, changes with distance along the waveguide—in order to compensate for the decrease in light intensity along the waveguide owing to partial escape of the light at each bounce. The reflectivity of the graded coating therefore decreases with distance from the input port. The graded coating may comprise a stack of thin films, optionally, wherein each thin film is a dielectric or a metal. The person skilled in the art will be familiar with the design of such stacks and will appreciate the difficulties in provide the required optical characteristics for multicolour pupil expansion as described herein.

In some embodiments, the spatially-modulated light is light of a picture formed on intermediate plane between the picture generating unit and viewing window. The picture formed at the intermediate plane may be formed in free-space or may be formed on a screen such as a diffuser. In these embodiments, the amplitude of the light is spatially-modulated in accordance with the displayed picture. In these embodiments, it may therefore be said that the first display channel is arranged to display the first picture and the second display channel is arranged to display the second picture. Each picture may be formed on the intermediate plane or screen by holographic projection using a hologram of the picture. That is, each display channel may display a hologram that is illuminated and forms a picture on the intermediate plane or screen (e.g. diffuser) by holographic reconstruction. In embodiments in which the picture (i.e. holographic reconstruction) is formed on a screen, it may be preferable to consider the screen to be part of the picture generating unit. In this case, it may be said that the screen is disposed between the hologram plane and the viewing plane.

In other embodiments, the spatially-modulated light is encoded with a hologram. In these embodiments, a hologram is displayed and light spatially-modulated in accordance with the hologram pattern may be used to reconstruct the picture. It is sometimes said that, in this configuration, the lens of the viewer's eye performs the hologram-to-image (e.g. frequency domain to spatial domain) transformation. The holographic reconstruction may therefore be formed on the viewer's retina. Optionally, a lens may be included between the display/hologram and viewer in order to relay the holographic reconstruction or determine the location of the reconstruction plane. The hologram may be a Fourier hologram. Embodiments in which the viewer looks directly at the hologram (e.g. spatial light modulator displaying the hologram) may be referred to as direct view. Direct view embodiments are characterised by the absence of a screen (e.g. diffuser) between the viewer and hologram. Direct view embodiments may be advantageous because the problems associated with using a screen/diffuser are not encountered.

The first/second holographic reconstruction may comprise a first/second picture (or image) area containing the first/second picture (or image) and a first/second non-picture (or non-image) area containing first/second non-picture (or non-image) content. The projector further comprises a closed-loop feedback system including a first/second light detector arranged to measure the brightness of the first/second non-image area. The hologram redirects light to different points on the replay field. The hologram may be a phase hologram such as a phase-only hologram. The brightness of the non-image area may therefore be indicative of the brightness of the corresponding image area because of the nature of the holographic process. In some embodiments, if the brightness of the non-image area is maintained—e.g. by modulating the output of the light source—the brightness of the image area will be maintained. These embodiments address the problem that the brightness of the holographic replay field is a function of the amount of image content formed by the hologram.

In some embodiments, the controller is arranged to maintain the relative brightness of the first picture area and the second picture area as substantially constant by applying a primary drive signal correction to the drive signal of the first/second light source based on the brightness of the first/second non-picture area measured by the first/second detector. The primary drive signal correction may be a correction to the voltage of the drive signal or a correction to the on-off temporal gating of the drive signal.

The controller may be arranged to maintain as substantially constant the relative brightness of the first and second picture as seen from the viewing position by applying a secondary drive signal correction to the drive signal of the first/second light source. The secondary drive signal correction is a function of viewing position within the viewing window. A primary drive signal correction compensates for the holographic process and a secondary drive signal correction compensates for the non-achromaticity of the graded mirror. The primary drive signal correction may maintain a target output from the light detector and the secondary drive signal correction may provide a change to the target output—e.g. the secondary drive signal correction may be an offset to the target output. The target output may, for example, be a value of voltage or current. The value of the offset required to maintain the first/second image brightness may be determined by calibration. The target output and offset as a function of viewing position may be stored in a look-up table of memory of the projector.

Alternatively, or additionally, the controller may be arranged to maintain as substantially constant the relative brightness of the first and second image as seen from the viewing position by changing/recalculating the first/second hologram in response to the viewing position determined by the viewer-tracking system. The holographic replay plane comprises a zero-order replay field. The zero-order replay field comprises a zero-order spot at its centre. The zero-order spot comprises light that has not been modulated by the spatial light modulator. There is disclosed herein various ways of changing the ratio of modulated to unmodulated light in the zero-order replay field. Each one of these methods may be used to fine-tune the brightness of the first/second image based on the detected viewing position.

The value of each hologram pixel may be restricted to one of a plurality of allowable light modulation levels in accordance with a quantisation scheme. Recalculating the first/second hologram may comprise changing the quantisation scheme in order to change the proportion of light contributing to the zero-order spot of the holographic reconstruction.

Changing the quantisation scheme may comprise reducing the light modulation range within which the allowable light modulation levels are distributed. Alternatively, or additionally, changing the quantisation scheme may comprise changing the vector sum of the vectors representing the allowable light modulation levels on the complex plane. This changes the proportion of light contributing to the zero-order spot and therefore changes the brightness of the perceived image.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "writing" and "addressing" may be used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
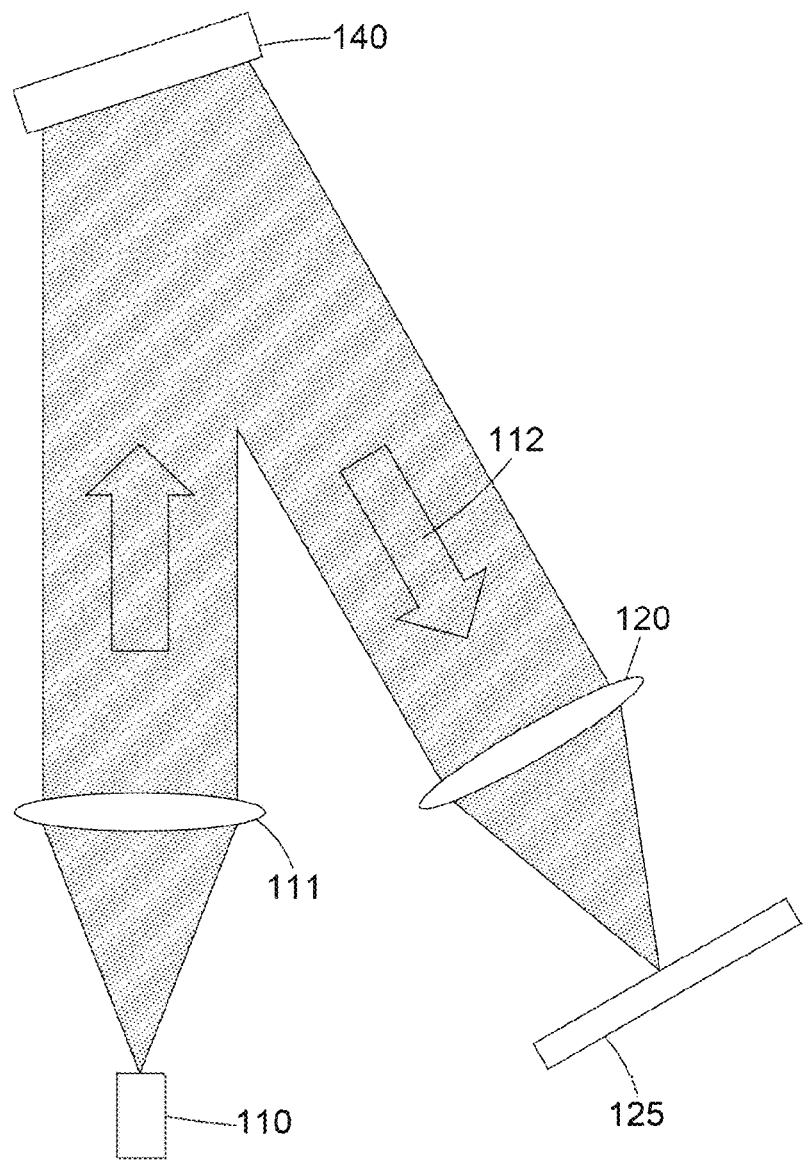
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer).

However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image.

The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
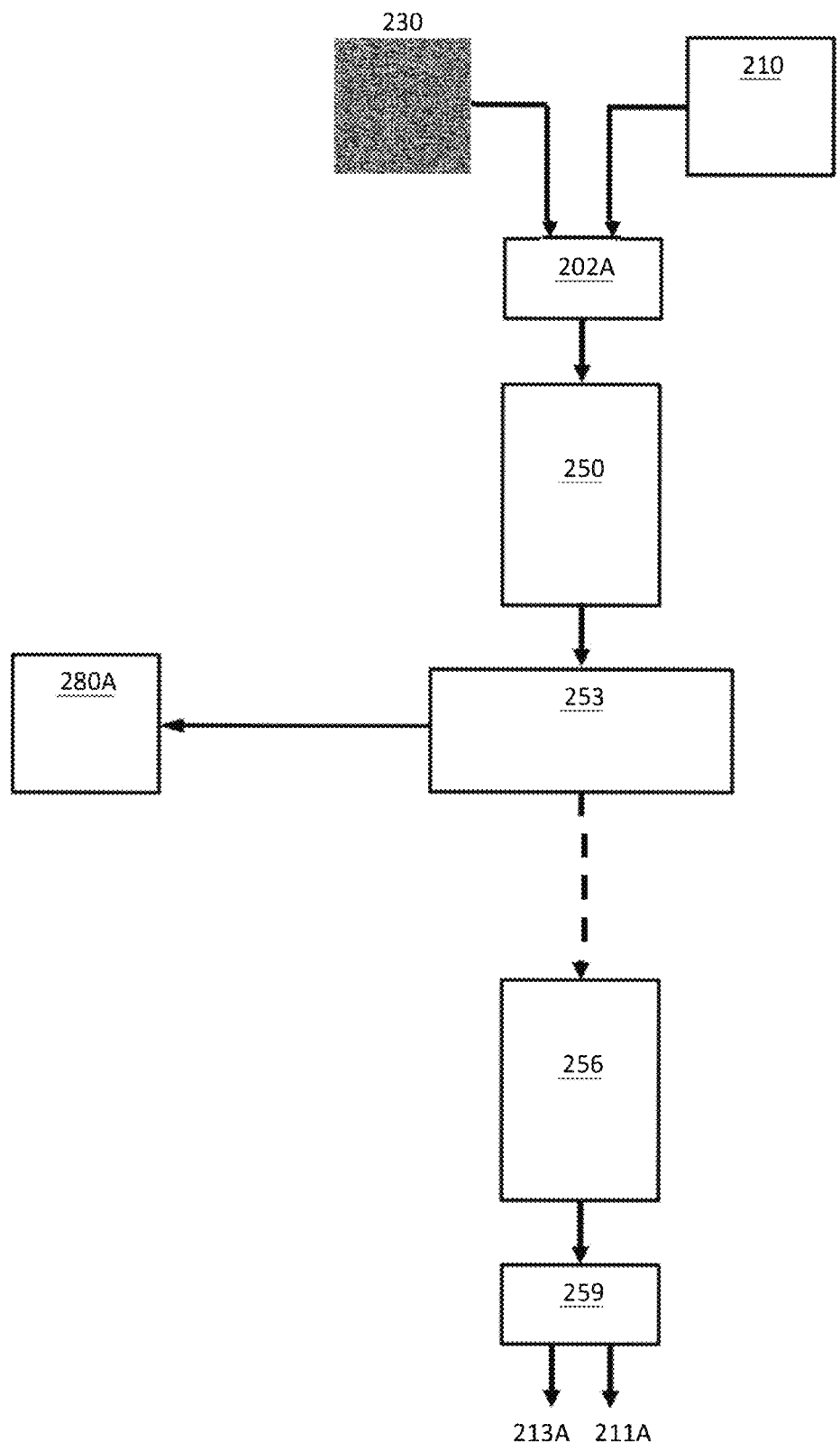
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
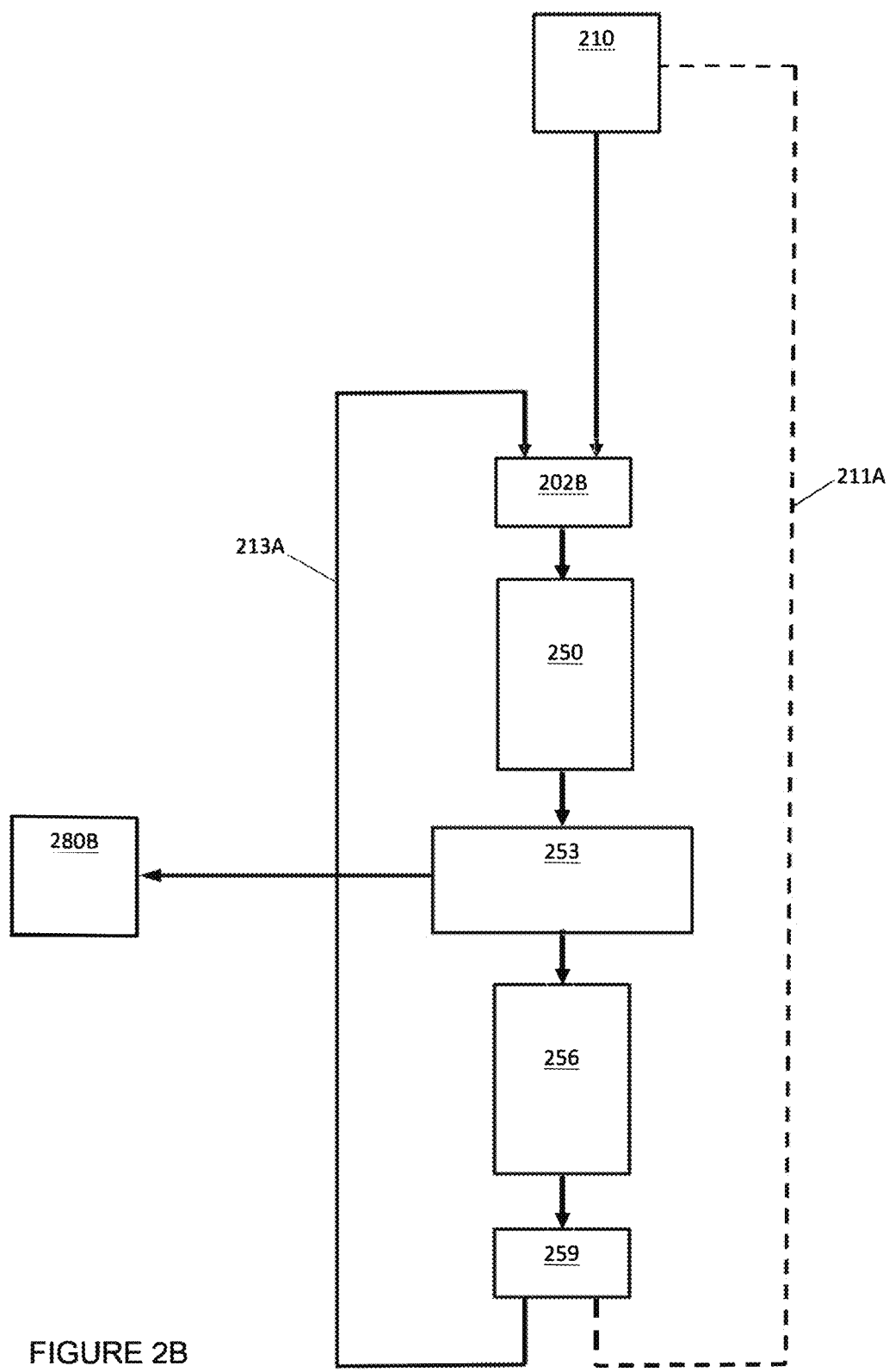
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
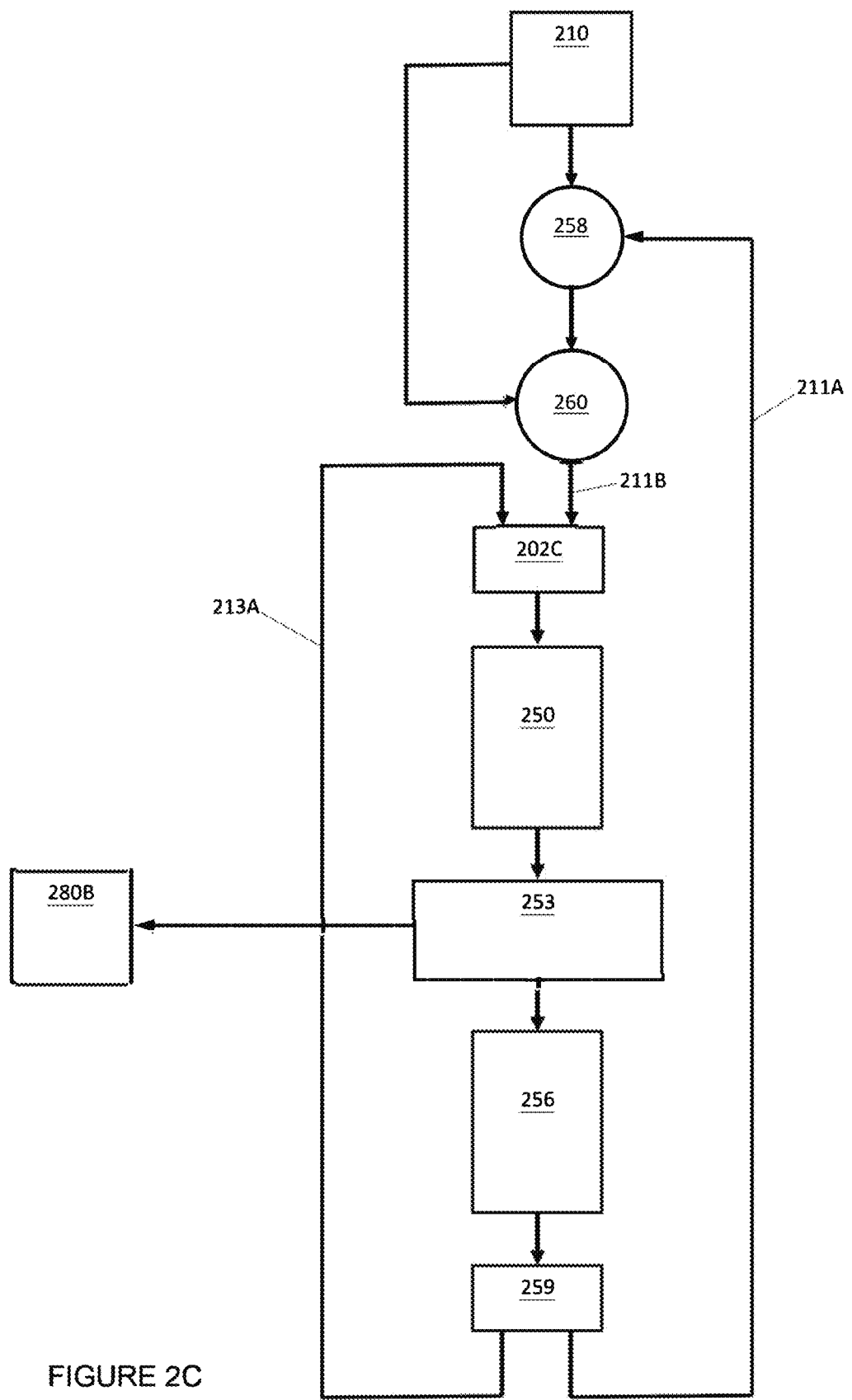
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta\cdot\exp(i\angle R_n[x,y])\}$$

$$\eta=T[x,y]-\alpha(|R_n[x,y]|-[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
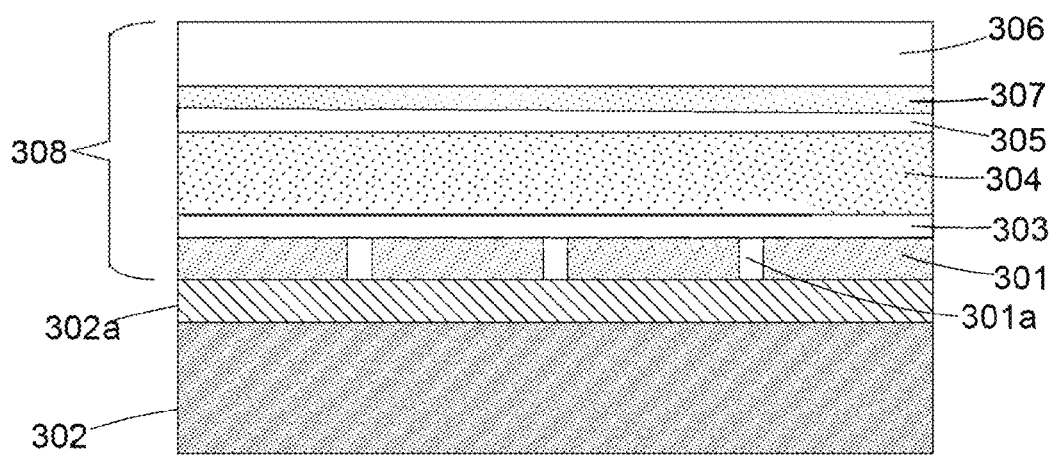
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Waveguide Pupil/Viewing Window Expander

In holographic projection systems such as head-up displays (HUDs) it is desirable to expand the exit pupil corresponding to the eye box region or viewing window. In particular, the viewer needs to be able to move his or her head around and so able to see the complete image from any position within a limited area at the eye box/viewing distance. This is known as the eye motion box (EMB) or viewing window. Thus, a pupil expander may be employed to enlarge the EMB or viewing window. Typically, the pupil expander enlarges the EMB by generating extra rays by division of the amplitude of the incident wavefront.

Figure 4:
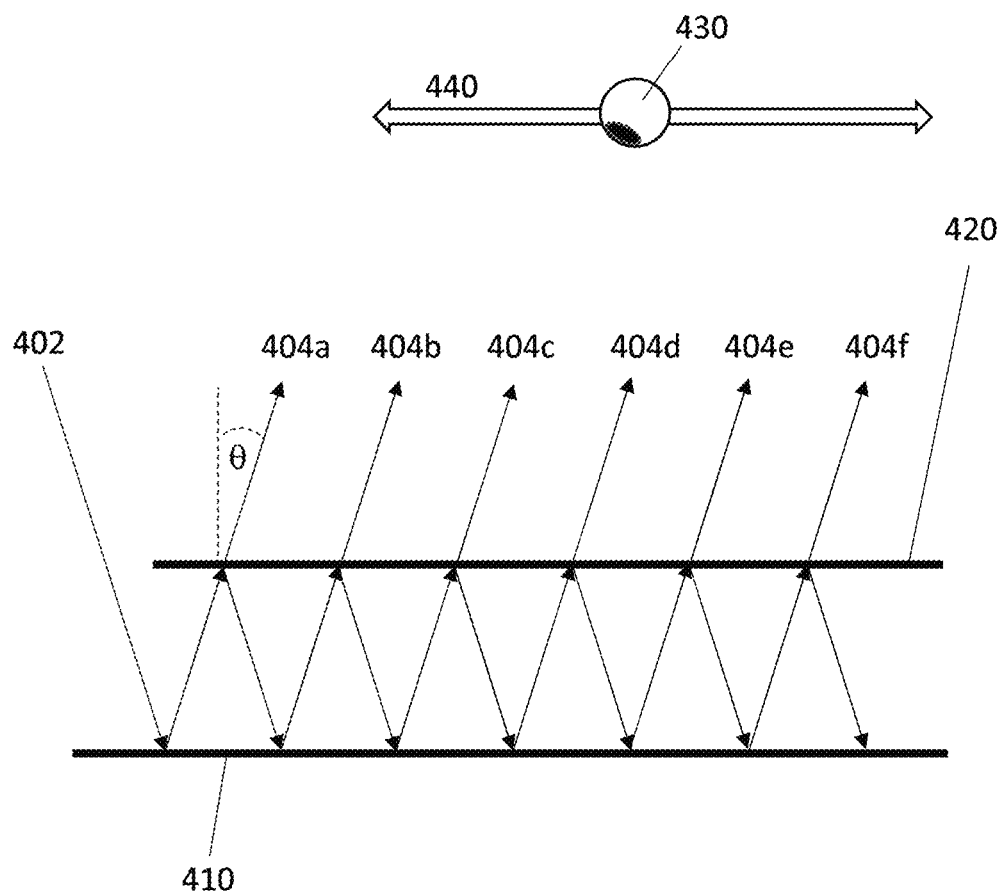
FIG. 4 shows an example pupil expander comprising a waveguide.

FIG. 4 illustrates an example pupil expander comprising a waveguide. The general principle of a waveguide is known in the art and not described in detail herein. A waveguide guides light within a layer between a pair of parallel reflective surfaces by internal reflection. A pupil expander is formed from a waveguide comprising a first graded/partially reflective surface 420 (e.g. a graded mirror having varying reflectivity with distance) and a second fully reflective surface 410 (e.g. a mirror having substantially 100% reflectivity). In particular, first reflective surface 420 comprises a reflective coating the reflectivity of which decreases along the length of the slab. The layer may be glass or Perspex. The waveguide may therefore be a glass or Perspex block or slab. The first reflective surface may be a first surface of the glass block and the second reflective surface may be a second surface of the glass block, wherein the first surface is opposite and parallel to the second surface. Alternatively, the layer may be air and the first and second reflective surface may be separate components—e.g. a first and second mirrors spatially-separated to form an air gap within which light propagates by internal reflection.

Accordingly, as shown in FIG. 4, an input light beam 402 (which may comprise spatially modulated light encoded with a picture (i.e. light of a picture/image or, simply a picture) or spatially modulated light encoded with a hologram as described below) comprising input light rays enters the waveguide through an input port thereof. The waveguide is arranged to guide light received at the input port to a viewing window. In the illustrated arrangement, the input port comprises a gap in the first partially reflective surface 420 near one end of the waveguide, but other positions for the input port are possible. The viewing window is an area or volume within which a viewer may view an image as described herein. The angle of incidence of the input light beam 402 is such that the light rays propagate along the length of the waveguide due to internal reflection by first partially reflective surface 420 and second fully reflective surface 410. Example rays are illustrated in FIG. 4. Due to the graded reflectivity of first reflective surface 420, a proportion of light is transmitted by first reflective surface 420 to provide a plurality of output light rays 404a-f (herein called "replicas" because they replicate the input light rays) along the length of the waveguide. Thus, first reflective surface 420 forms a viewing surface. It is said that the pupil (or viewing window) is expanded by the replicas formed by the waveguide. In particular, by forming a plurality of replicas 404a-f along the length of the waveguide, the viewing window is increased in size. Each replica 404a-f corresponds to a proportion of the amplitude (intensity or brightness) of the input light beam 402. It is desirable that the grading provides a decrease in reflectivity (or conversely an increase in transmissivity) of the first reflective surface 420 along the length of the waveguide such that each replica 404a-f has substantially the same amplitude. Thus, a viewer 430 at the eye box at a viewing distance from the first reflective surface 420 is able to see the image at any position within an expanded viewing window, as illustrated by arrows 440.

The waveguide shown in FIG. 4 expands the viewing window in one dimension—corresponding to the lengthwise direction along which the light beam propagates within the waveguide—as shown by arrows 440. As the skilled person will appreciate, it is possible to expand the viewing window in two dimensions, when required, by using two orthogonal waveguides.

The first reflective surface 420 of the waveguide may be coated with a coating comprising a large number of thin films (e.g. 25 or more thin films) in order to provide the necessary graded reflectivity. In particular, as described above, such thin films or similar coatings need to provide decreasing reflectivity, and thus increasing transmissivity, with propagation distance such that the brightness (ray intensity) of each replica 404a-f is substantially constant. The amplitude of the propagating light beam reduces with propagation distance due to output of the replicas 404a-f and due to any other optical losses such as imperfect reflections from the second reflective surface 410. Thus, the grading of the first reflective surface 420 is designed to take into account the drop in intensity of the propagating light beam with propagation distance, whilst ensuring that each replica 404a-f has substantially the same intensity so that the image seen has uniform brightness throughout the viewing window (i.e. at all viewing positions).

Figure 5:
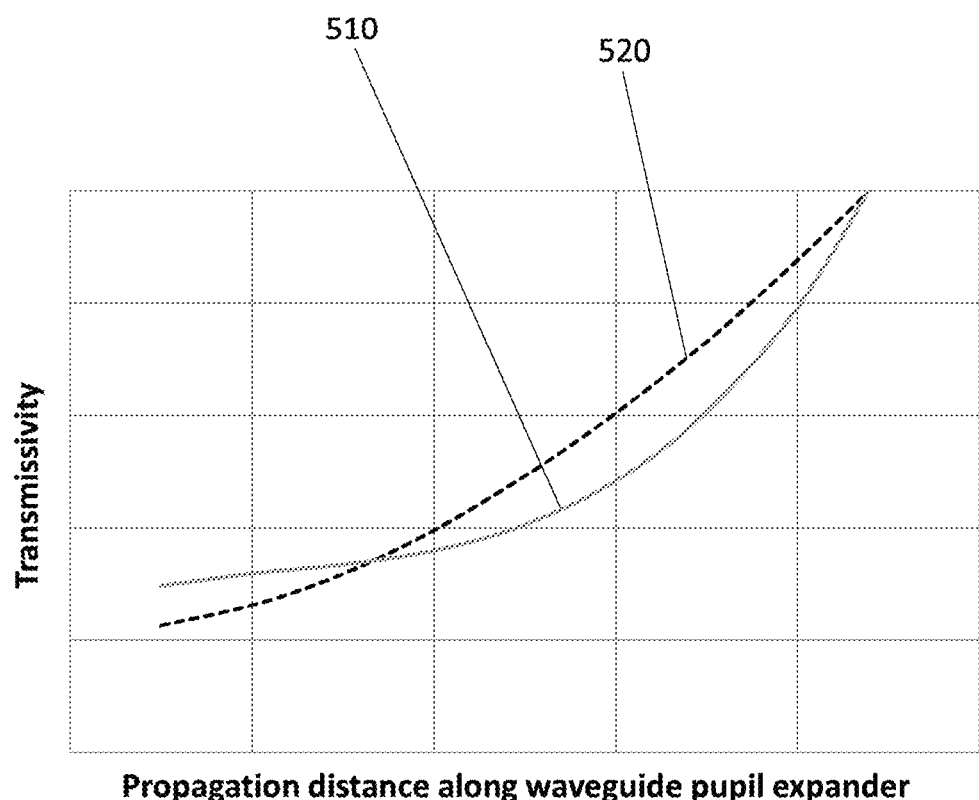
FIG. 5 shows an example graph of transmissivity vs propagation distance along the waveguide of FIG. 4 for light of different wavelengths.

In implementations, the waveguide pupil expander is used to expand the viewing window for input light beams 402 of different wavelengths. For example, a composite colour image may be formed from multiple single colour (monochromatic) images, such as red, green and blue images. Thus, the waveguide of FIG. 4 may need to provide the same performance for input light beams 402 of a plurality of individual wavelengths. In embodiments, the individual wavelengths are within the visible spectrum. Accordingly, the graded reflectivity of the first reflective surface 420 needs to output replicas 404a-f having substantially constant intensity with propagation distance for each wavelength, such as for red, green and blue incident light beams 402. However, it is difficult, if not impossible, to form a first reflective surface 420 that provides the same performance/light response for two or more wavelengths along the entire length of the waveguide using thin films and coatings. This problem is illustrated in FIG. 5, which shows a graph of transmissivity vs distance for respective red 510 and green 520 input light beams along an example first reflective surface 420. As shown in FIG. 5, the change in transmissivity of the first reflective surface with distance varies considerably for red and green wavelengths. In particular, the first reflective surface has a different reflectivity response to red and green wavelengths. It may be said that the first reflective surface is "non-achromatic"—the reflectivity/transmissivity of the first reflective surface (e.g. thin films or coatings) is wavelength dependent and so changes dependent on the incident wavelength of light. This means that the replicas 404a-f have different intensity at different wavelengths (colours). This leads to non-uniform intensity between the different single colour images when viewed from different positions within the viewing window. It may be said that there is non-uniform colour balance of the composite colour image across the viewing window.

Example implementations of the present disclosure comprise holographic display devices and methods that use a waveguide as a pupil expander to provide more uniform colour images across an expanded viewing window.

First Embodiments

Figure 6:
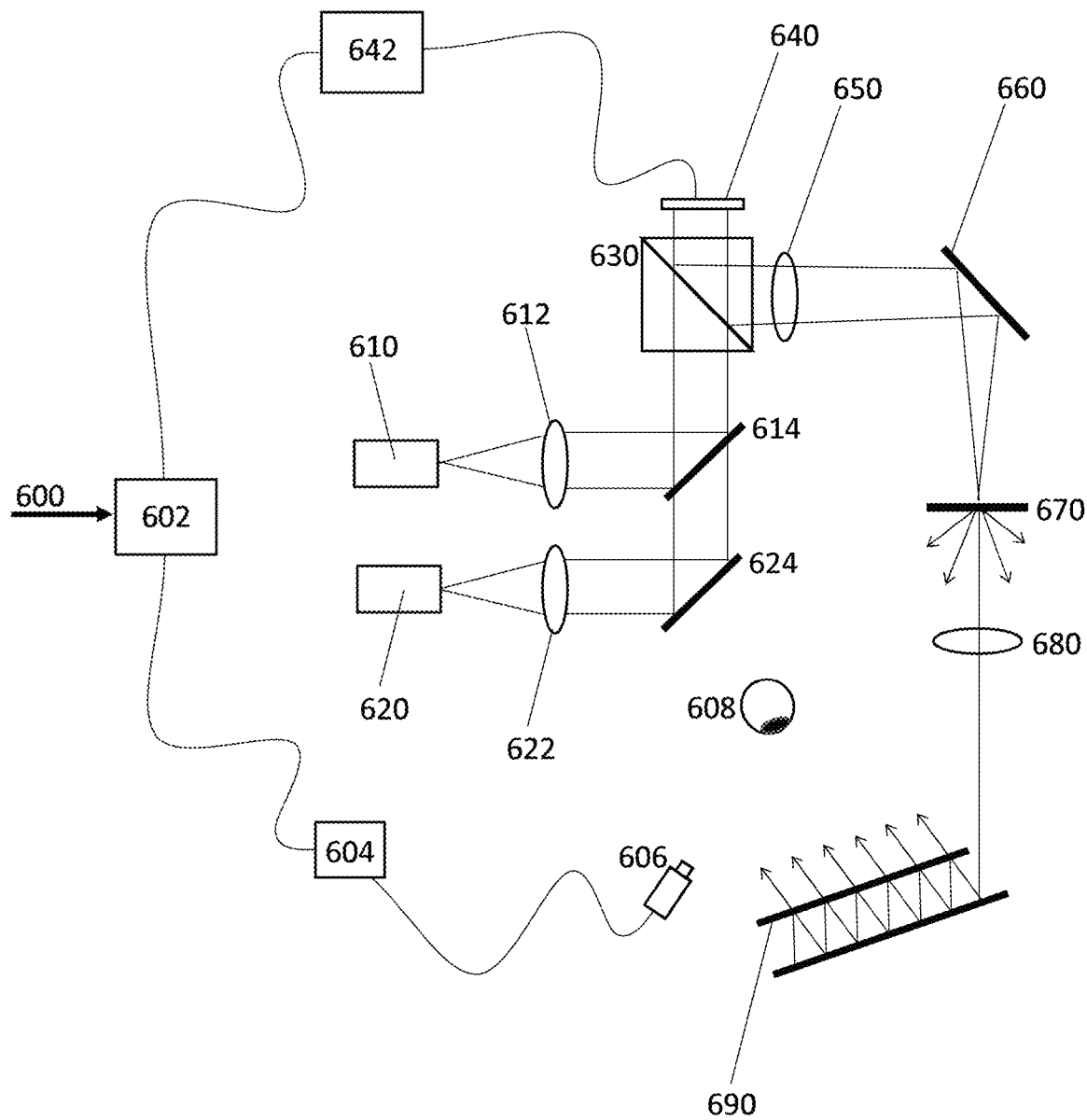
FIG. 6 shows a holographic display device comprising a pupil expander in accordance with embodiments.

FIG. 6 shows a holographic display device comprising a waveguide forming a waveguide pupil expander in accordance with first example embodiments of the present disclosure.

Holographic display device comprises a picture generating unit arranged to form a first picture (also called "first image") and a second picture (also called "second image"). A first single colour channel (also called "first display channel") is arranged to form the first picture and comprises a first light source 610, a first collimating lens 612 and a first dichroic mirror 614. First dichroic mirror 614 is arranged to reflect light of a first wavelength along a common optical path so as to illuminate a spatial light modulator (SLM) 640. The first wavelength of light corresponds to the first display channel of a first colour (e.g. red). A second single colour channel (also called "second display channel") is arranged to form the second picture and comprises a second light source 620, a second collimating lens 622 and a second mirror 624. Second mirror 624 is arranged to reflect light of a second wavelength along the common optical path so as to illuminate the SLM 640. The second wavelength of light corresponds to the second single colour channel of a second colour (e.g. green). As described below, in other embodiments, the picture generating unit may comprises a third single colour/display channel (equivalent to the first and second channels) arranged to form a third picture, wherein the third colour channel corresponds to a wavelength of light of a third colour (e.g. blue). In the illustrated embodiment, SLM 640 comprises a single array of light modulating pixels (e.g. LCOS) that is illuminated by light of both the first and second wavelengths. In other embodiments, SLM 640 may comprise separate arrays of light modulating pixels that are illuminated by light of the respective first and second wavelengths.

Holographic display device further comprises a holographic controller 602 arranged to control the picture generating unit, specifically the light output by picture generating unit as described herein. First spatially modulated light of the first colour corresponding to the first picture is output by SLM 640 to form a first single colour image (e.g. red image) on a light receiving surface 670, such as a screen or diffuser. A first single colour computer-generated hologram is calculated by a holographic controller 602 and encoded on SLM 640, for example by a display driver 642. The SLM 640 displays the first hologram and is illuminated by light of the first colour from the first colour/display channel to form a first holographic reconstruction on the light receiving surface 670 which is positioned at the replay plane. Similarly, second spatially modulated light of the second colour corresponding to the second picture is output by SLM 640 to form a second single colour image (e.g. green image) on the light receiving surface 670. A second single colour computer-generated hologram is encoded on SLM 640 by holographic controller 602. The SLM 640 displays the second hologram and is illuminated by light of the second colour from the second colour/display channel to form a second holographic reconstruction on the light receiving surface at the replay plane. In the illustrated arrangement, a beam splitter cube 630 is arranged to separate input light to SLM 640 and spatially modulated light output by SLM 640. A Fourier lens 650 and mirror 660 are provided in the optical path of the output spatially modulated light to light receiving surface 670. It may be said that a first/second picture is formed on the light receiving surface 670. The first/second pictures are first/second holographic reconstructions of the respective first/second holograms. Thus, a composite colour picture may be formed on light receiving surface 670 combining the first and second pictures. A projection lens 680 is arranged to project the first and second pictures formed on the light receiving surface 672 to an input port of a pupil expander in the form of a waveguide 690. A viewer 608 may view a magnified image of the pictures from the expanded eye box—the "viewing window"—formed by waveguide 690 owing to optical power of projection lens 680. Waveguide 690 comprises an optically transparent medium separated by first and second reflective surfaces as described above with reference to FIG. 4. Thus, holographic display device has an "indirect view" configuration—that is the viewer does not directly view the holographic reconstruction, but rather views pictures formed on light receiving surface 670.

The holographic display device further comprises a viewer-tracking system comprising an eye tracking camera 606 and an eye tracking controller 604. As known in the art, eye tracking camera is arranged to capture images of the eye(s) of the viewer for tracking the eye position, and thus the viewing position within the viewing window. Eye tracking controller 604 provides feedback to holographic controller 602 indicating the current viewing position. In example implementations, holographic controller 602 is arranged to dynamically adjust the relative brightness of the first and second images according to the current viewing position. In particular, the relative brightness of the first and second images may be adjusted to compensate for a difference in the reflectivity of light of the first and second wavelengths of the first (partially) reflective surface of the slab waveguide at the propagation distance corresponding to the current viewing position. It may be said that the holographic controller 602 is arranged to adjust the relative brightness of the first and second images seen at the current viewing position to compensate for the difference in reflectivity response of the second reflective surface to light of the respective first and second wavelengths. This maintains the perceived colour balance at different viewing positions within the viewing window. Calibration data may be used to fine-tune the brightness of one or more of the single colour images in real-time in order to maintain colour balance. The calibration data may be obtained by a calibration process comprising measuring the relative brightness of each single colour image at a plurality of different viewing positions within the viewing window.

In some implementations, the holographic controller 602 may be arranged to adjust the relative brightness of the first and second pictures according to the current viewing position by adjusting one or more drive signals (e.g. provided by a light source controller) to the first light source 610 and second light source 620. A drive signal to a light source controls the power to the light source and thus the optical power of the output light. In other implementations, the holographic controller 602 may be arranged to adjust the relative brightness of the first and second pictures by adjusting one or more of the first and second computer-generated holograms. For example, the quantisation scheme used for calculation of the first and/or second hologram may be changed in accordance with the current viewing position. The quantisation scheme may be changed to reduce the light modulation range within which allowable light modulation levels are distributed, which may change the intensity of pixels of the calculated hologram. Examples of adjusting the quantisation scheme for this purpose are described below.

In addition, a light detector (not shown) is arranged to measure the optical power of a non-image area of the replay field of the first/second holographic reconstruction formed on light receiving surface 670. The light detector may be positioned in front of the light receiving surface 670 or behind the light receiving surface 670. The light detector may provide a light detection signal to the holographic controller 602 as part of a closed-loop feedback system to maintain image content brightness as the image content changes, as described further below with reference to FIG. 8.

As well as the feedback input from viewer-tracking system and closed-loop feedback system (not shown), holographic controller 602 may receive other external and internal inputs 600 for use in generating the computer-generated holograms as known in the art. Such inputs may determine the image content for display by the holographic display device.

The holographic display device illustrated in FIG. 6 has a picture generating unit comprising a first colour (e.g. red) display channel arranged to display a first single colour hologram and a second colour (e.g. green) display channel arranged to display a second single colour hologram, by way of example only. In example implementations, three or more display channels may be provided configured to display respective single colour holograms. For example, a full-colour composite image/picture may be formed by displaying respective red, green and blue single colour holograms.

Waveguide Geometry

Figure 7A:
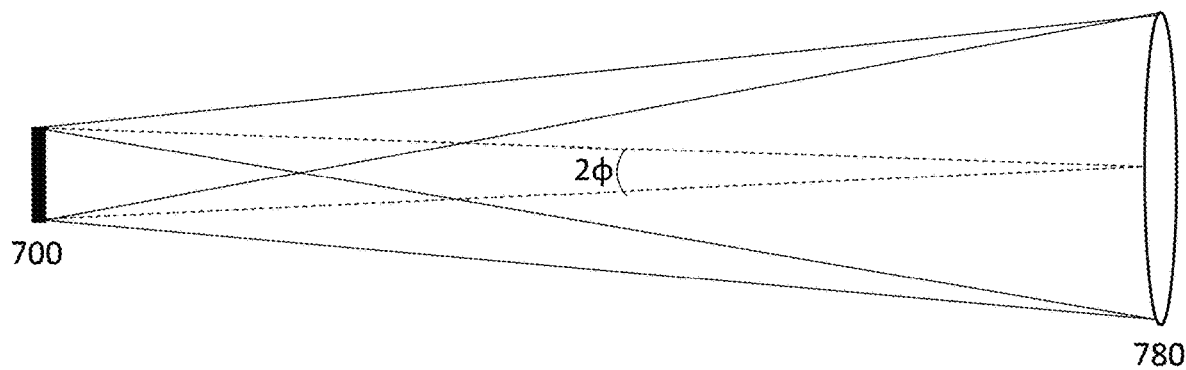
FIGS. 7A, 7B and 7C show the geometry of the pupil expander in accordance with embodiments.
Figure 7B:
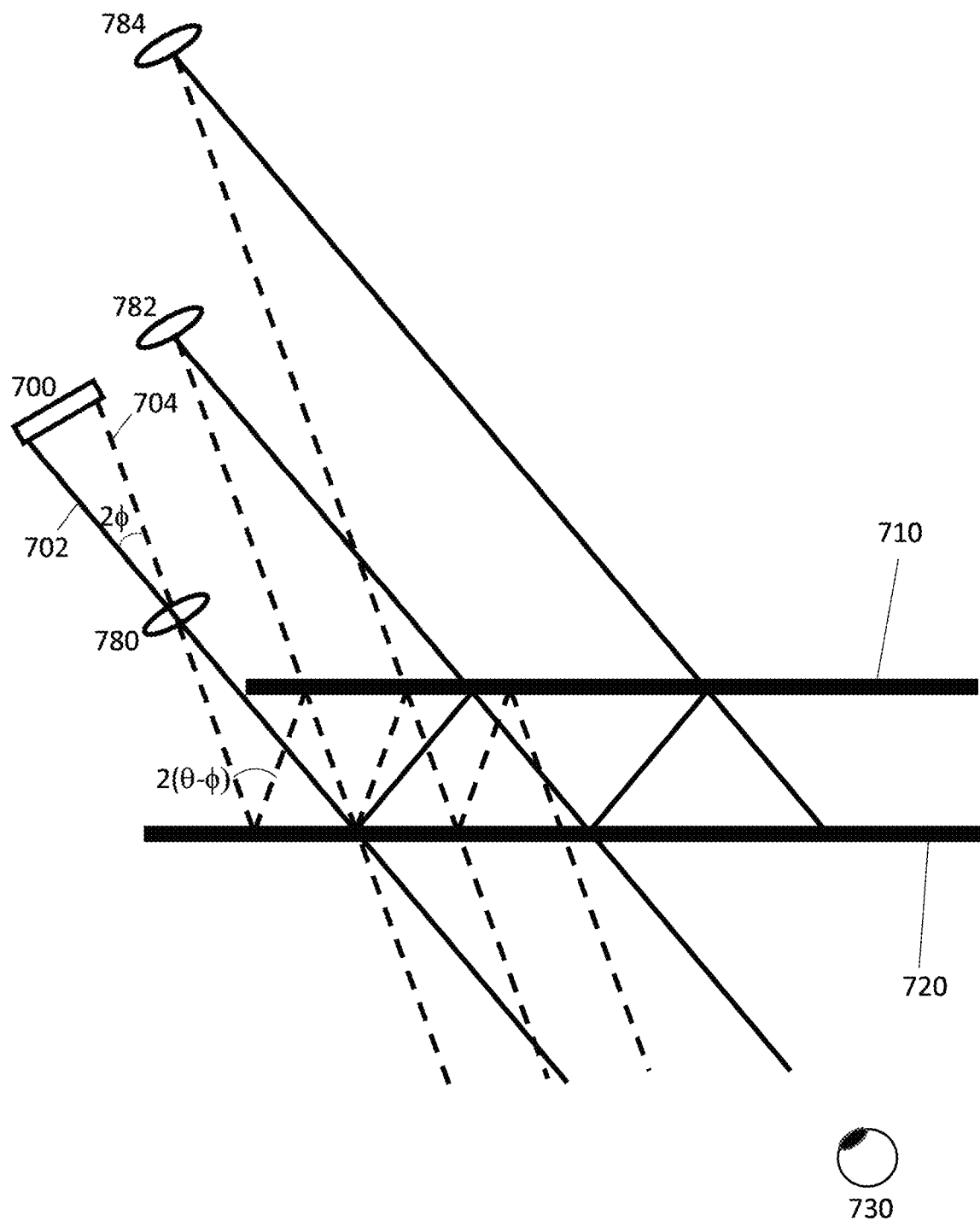
Figure 7C:
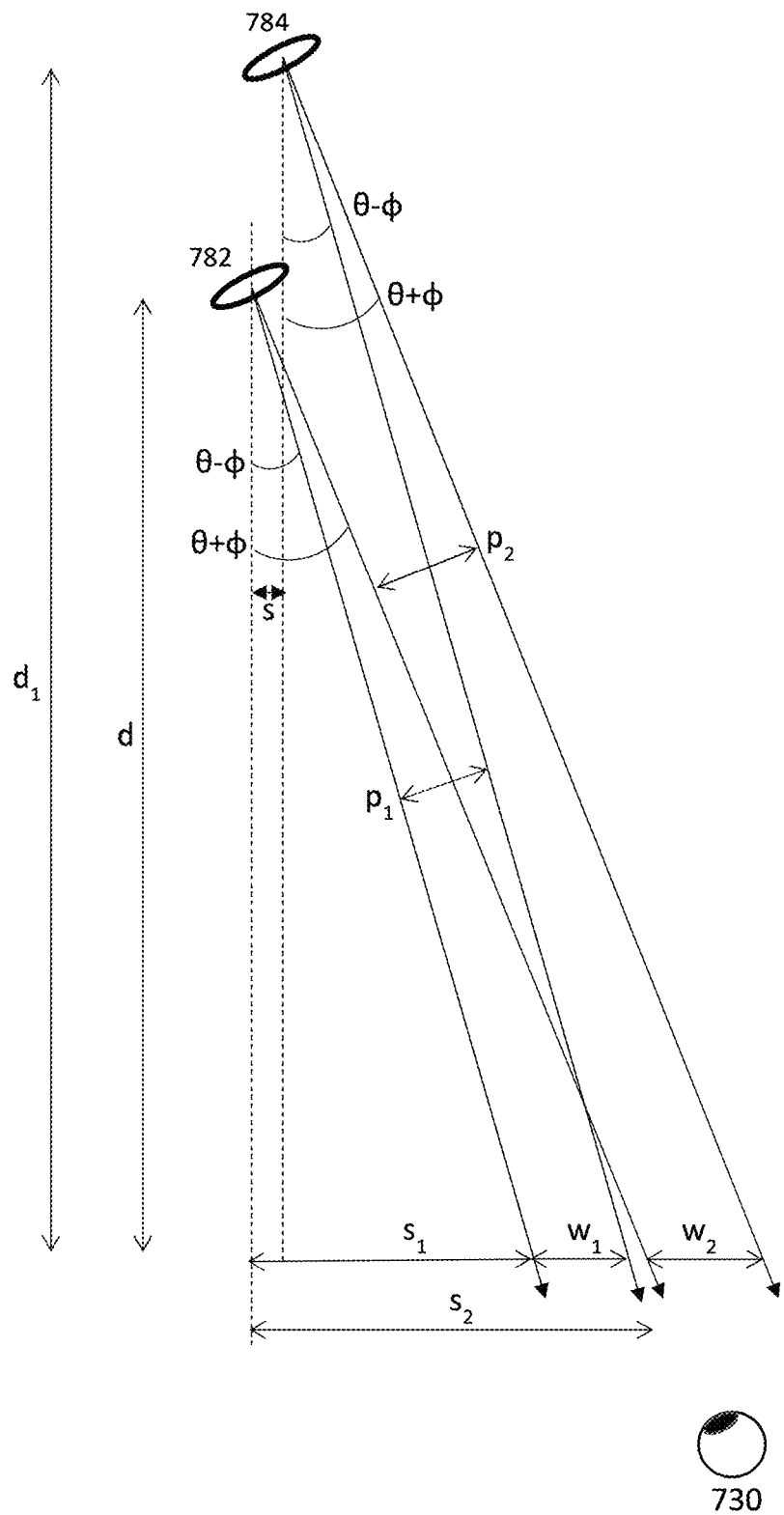

FIGS. 7A-C show the geometry of the waveguide pupil expander in accordance with embodiments. In particular, FIGS. 7B and 7C show the positioning, and propagation along waveguide, of the chief rays of an input image beam 702 (as a described above) and the output of replicas visible to viewer 730. Waveguide comprises first partially reflective surface 720 and second fully reflective surface 710 as described above.

The geometry shown in FIG. 7C may be represented by the following equations.

$$w_1 = 2d\tan(\theta-\phi)$$

$$w_2 = 2d\tan(\theta+\phi)$$

$$p_1 = 2d\sin(\theta-\phi)$$

$$p_2 = 2d\sin(\theta+\phi)$$

$$\tan(\theta-\phi) = s_1/d = (s_1+w_1-s)/d_1.$$

$$\tan(\theta+\phi) = s_2/d = (s_2-w_2-s)/d_1$$

$$s_1 d_1 = (s_1+w_1-s)d$$

$$s_1 \Delta d = 2d^2\tan(\theta-\phi) - sd \quad (1)$$

$$s_2 d_1 = (s_2+w_2-s)d$$

$$s_2 \Delta d = 2d^2\tan(\theta+\phi) - sd \quad (2)$$

Subtract (1) from (2)

$$\Delta d = 2d^2(\tan(\theta+\phi)-\tan(\theta-\phi))/(s_2-s_1)$$

Subtract $s_1(2)$ from $s_2(1)$ $$0 = 2s_2 d^2\tan(\theta-\phi) - ss_2 d - 2s_1 d^2\tan(\theta+\phi) - ss_1 d$$

$$s = (2s_2 d\tan(\theta-\phi) - 2s_1 d\tan(\theta-\phi))/(s_1+s_2)$$

$$= (s_2 w_1 - s_1 w_2)/(s_1+s_2)$$

Closed-loop Feedback System

Figure 8:
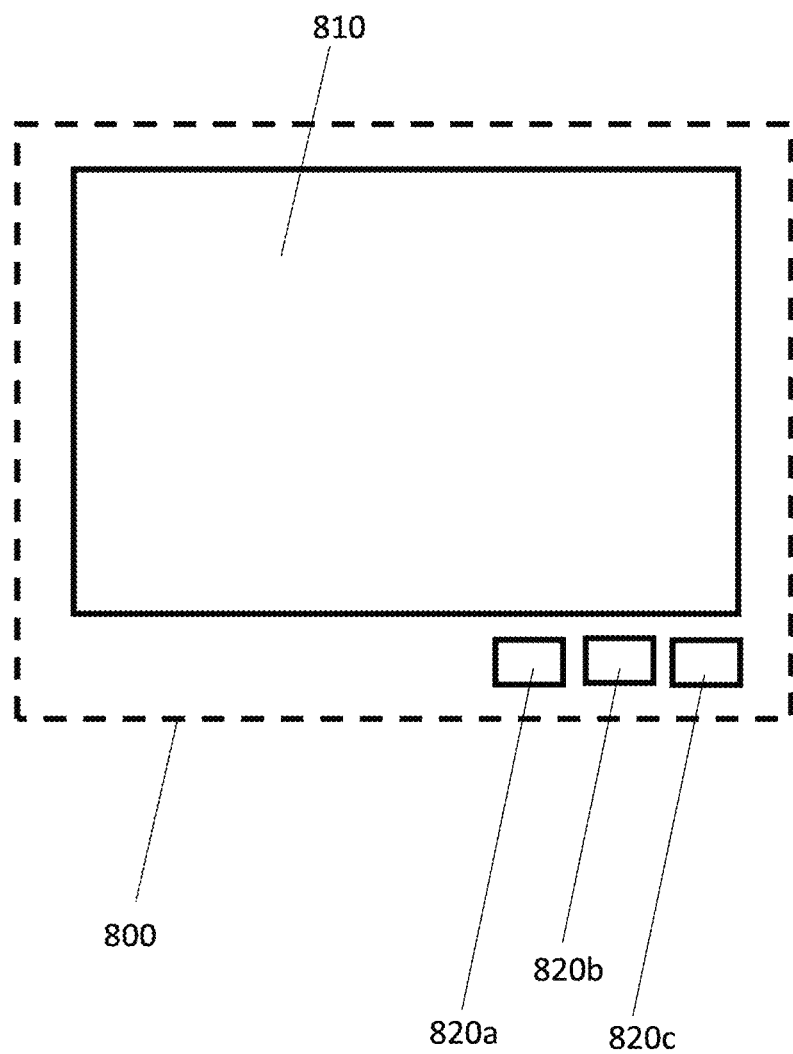
FIG. 8 shows a holographic replay field formed by a holographic display device in accordance with embodiments.

FIG. 8 shows an example holographic replay field 800 in accordance with embodiments.

For example, the illustrated holographic replay field comprises a composite colour image comprising three colour holographic reconstructions formed by displaying three corresponding single colour holograms (e.g. red, green and blue) by a holographic display device in accordance with embodiments. As described below, the composite colour image may be perceived by a viewer by forming the three colour holographic reconstructions at the same time or by forming the three colour holographic reconstructions sequentially within the integration time of the human eye.

Holographic replay field 800 comprises an entire replay field area of a replay plane. As described previously, the replay field is the area of the replay plane where light can be redirected using the hologram. In accordance with embodiments, a primary area 810 is designated for displaying image content, corresponding to the desired composite colour image to be viewed by the viewer. Primary area 810 may be considered as a first/second/third picture area (or image area). In addition, first, second and third secondary areas 820*a-c*, spatially separated from the primary area 810, are designated for displaying non-image content. Secondary areas 820*a-c* may be considered as first/second/third non-picture (or non-image) areas. In particular, a first single colour holographic reconstruction includes the first non-image area 820*a*, a second single colour holographic reconstruction includes second non-image area 820*b* and a third single colour holographic reconstruction includes the third non-image area 820*c*. Each of the first, second and third non-image areas 820*a-c* displays corresponding single colour non-image content, such as a defined colour spot or pattern of image pixels. The non-image areas 820*a-c* are spatially separated from the image area 810, for example disposed peripherally to the image area 810. As shown in FIG. 8, first, second and third non-image areas 820*a-c* are arranged adjacent each of near the boundary of the holographic replay field 800. As the skilled person will appreciate, each single colour hologram is calculated to include desired image content and non-image content. The purpose of the non-image content is described below.

As described previously, a holographic reconstruction formed by displaying a hologram comprises image pixels that are formed within the replay field at a replay plane. When a hologram is displayed using a pixelated spatial light modulator (SLM) as described herein, each hologram pixel of the calculated hologram contributes to each image pixel formed in the replay field. Furthermore, the output power of the SLM is dependent on the power of the incident light because the hologram merely redirects light. The power of the incident light typically remains constant. In consequence, the intensity or brightness of each image pixel, and thus the image, formed is dependent on the number of bright image pixels in the replay field. However, the number of image pixels displayed dynamically changes according to the displayed image. Thus, visible changes in the brightness of the image can occur during display of a dynamically changing image with time.

Accordingly, embodiments comprise a closed-loop feedback system, as briefly described above with reference to FIG. 6, to maintain the brightness of the image using the non-image content shown in FIG. 8. In particular, the closed-loop feedback system ensures that the brightness of each single colour picture remains substantially constant, based on measurement of the optical power of the corresponding single colour secondary/non-image area 820*a-c*.

As the skilled person will appreciate, the brightness of image pixels in the non-image content in each non-image area 820a-c changes in proportion to the brightness of image pixels in the corresponding single colour image content in the image area 810. Accordingly, a measurement of the optical power of the non-image content is indicative of the brightness of the image content. Thus, feedback of the measured optical power may be used to maintain substantially constant the brightness of each single colour image in the primary (image) area 810 by setting a desired optical power of the secondary (non-image) image area 820a-c accordingly as a parameter of an error-correcting feedback loop. In some embodiments, a light controller for each single colour light source (e.g. laser) and/or the holographic controller is arranged to maintain the optical power of the single colour image in the primary image area 810 at a substantially constant value in response to the detected optical power of the non-image content displayed in the secondary image area 820a-c.

For a given single colour holographic reconstruction/image, the brightness of the primary (image) area 810 may be maintained by using a reference optical power of the secondary (non-image) area 820. Specifically, the brightness of the image area 810 may be maintained at a level at which the optical power of the non-image area 820 is at the reference value. In some embodiments, the light controller is arranged to decrease the optical power of the light output by the light source if the detected optical power of the non-image area 820 is greater than the reference optical power and/or increase the optical power of the light output by the light source if the detected optical power of the non-image area 820 is less than the reference optical power.

The reference optical power for the non-image area 820 may be determined by any means, to correspond to a desired brightness, for example measured in terms of luminance, by a calculation that takes account of the area (e.g. number of image pixels) of the non-image image area 820 and possibly other factors, such as perceptual wavelengths scaling. For example, the reference optical power may be hardwired in the system, predetermined by a user or selected by a user. In some embodiments, the reference optical power is determined by the optical power of the non-image area 820 at an earlier time, for example to maintain image brightness constant overtime.

In some embodiments, feedback control with respect to the reference value may involve a feedback loop, for example with the light controller changing the optical power of the light output in proportion to a value obtained by subtracting the detected optical power from the reference optical power to provide a proportional control term. A gain factor may be used to multiply this difference to convert the feedback signal to units related to brightness, for example luminance. Other control terms such as differential and integral terms or other, for example non-linear, terms may also be used. In some embodiments, the feedback control may incorporate an element of hysteresis, for example the optical power of the light output may be increased if the detected optical power falls short of the reference optical power by more than a first threshold amount and may be decreased if the detected optical power exceed the reference optical power by more than a second threshold amount.

Embodiments of the present disclosure are arranged to dynamically adjust the brightness of each single colour image according to a viewing position detected by viewer-tracking system so that the relative brightness of the single colour images is substantially constant for all viewing positions within the expanded viewing window. Accordingly, embodiments may implement a closed-loop feedback system that is arranged to dynamically adjust the brightness of each single colour image according to the amount of image content displayed (e.g. number of image pixels formed in a designated image area 810). The closed-loop feedback system may be configured to provide primary feedback to maintain image content brightness as the image content changes with time. The viewer-tracking system may be configured to provide secondary feedback that is a function of the detected viewing position to compensate for the non-achromaticity of the partially reflective layer of the waveguide pupil expander as described above. For example, the secondary feedback may provide an offset value that is a function of the viewing position. Thus, the primary feedback may provide a primary drive signal correction to the drive signal to the light source, which corrects for changing in brightness caused by the changing amount of holographic image content. The secondary feedback may provide a secondary drive signal correction, which compensates for the non-achromatic graded mirror. The secondary drive signal correction for the detected viewing position may be determined by a calibration process as described herein.

As mentioned previously, various techniques are possible for adjusting the brightness of each single colour image. In some embodiments, the brightness of a single colour image may be adjusted using a light controller to change a drive signal to the corresponding single colour light source, which controls the optical power of the output light. By dynamically changing the drive signal it is possible to dynamically increase or decrease the optical power of the display device (i.e. SLM). In other embodiments, the hologram calculation may be changed to adjust the brightness of a single colour image as described further below.

Second Embodiments

Figure 9:
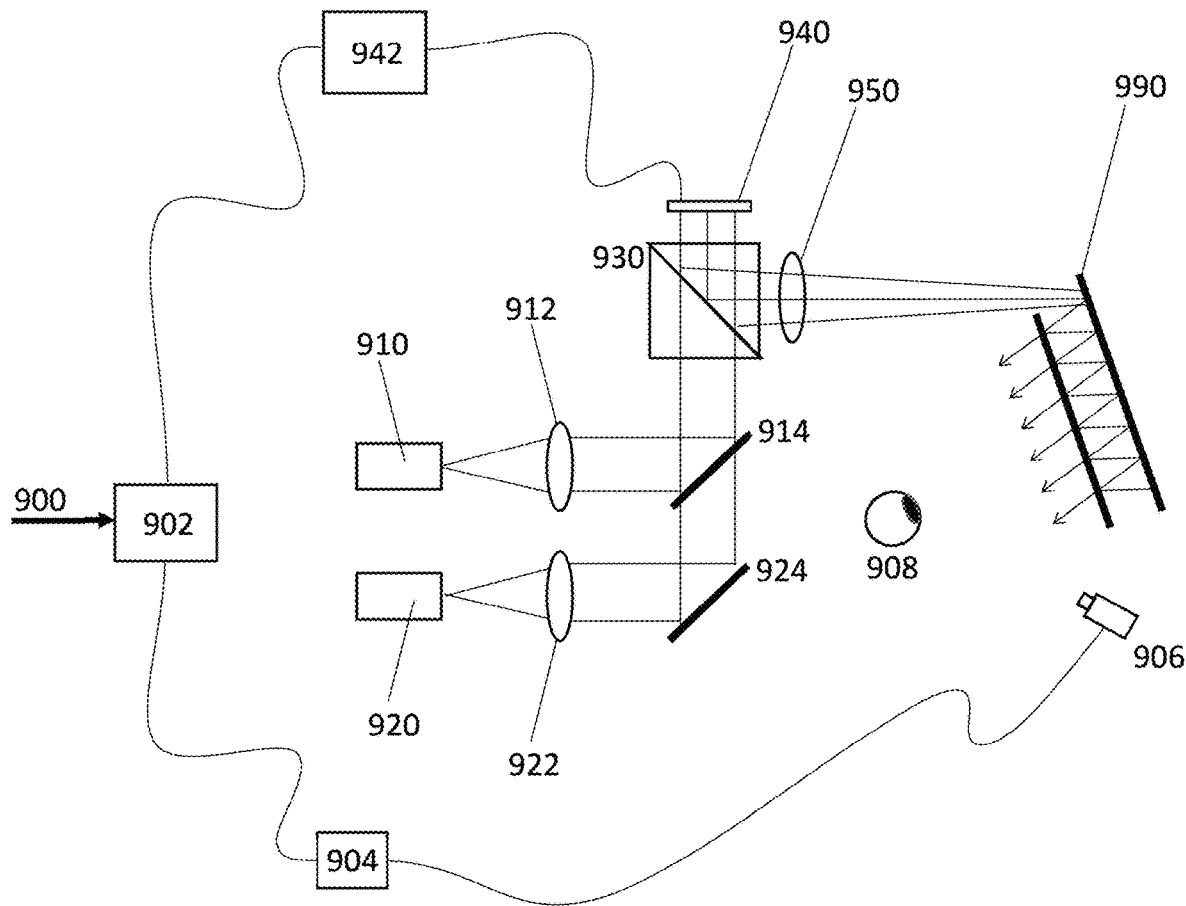
FIG. 9 shows a holographic display device comprising a pupil expander in accordance with further embodiments.

FIG. 9 shows a holographic display device comprising waveguide pupil expander in accordance with second example embodiments of the present disclosure.

The holographic display device illustrated in FIG. 9 is similar to the holographic display device of FIG. 6. In particular, holographic display device comprises a picture generating unit arranged to form a first picture (or first image) and a second picture (or second image). A first single colour/display channel (e.g. red colour channel) comprises a first light source 910, a first collimating lens 912 and a first dichroic mirror 914 arranged to illuminate SLM 940 with light of the first wavelength. A second single colour/display channel (e.g. green colour channel), comprises a second light source 920, a second collimating lens 922 and a second mirror 924 arranged to illuminate the SLM 940 with light of the second wavelength. The first display channel is arranged to form the first image (e.g. red image) on a light receiving surface 970. A first single colour computer-generated hologram is encoded on SLM 940 by a holographic controller 902. The SLM 940 displays the first hologram and is illuminated by light from the first colour channel to form a first holographic reconstruction on the light receiving surface 970 which is positioned at the replay plane. Similarly, the second display channel is arranged to form the second image (e.g. green image) on the light receiving surface 970. A second single colour computer-generated hologram is encoded on SLM 940 by holographic controller 902. The SLM 940 displays the second hologram and is illuminated by light from the second colour channel to form a second holographic reconstruction on the light receiving surface at the replay plane.

The holographic display device further comprises a beam splitter cube 930, arranged to separate input light to and output light from SLM 940. However, in contrast FIG. 6, the holographic display device is a direct view system. In the illustrated arrangement, a lens 950 is positioned in the optical path of the spatially modulated light output by SLM 940. Lens 950 is optional. A viewer 908 may directly-view the spatially modulated light from the spatial light modulator. In some embodiments, as described above, the lens of the viewer's eye forms a holographic reconstruction on the retina of the eye. In these embodiments, it may be said that the viewer receives spatially modulated light encoded with the hologram. In other embodiments, the viewer receives light of the picture or light encoded with the picture. The picture may be formed at an intermediate plane in free space. Waveguide 990 comprises an optically transparent medium separated by first and second reflective surfaces as described above. Thus, holographic display device has an "direct view" configuration—that is the viewer looks directly at the display device (i.e. spatial light modulator) and the light receiving surface of FIG. 6 is optional.

Hologram Calculation to Adjust Individual Single Colour Image Brightness

The hologram encoded on an SLM may be changed, to alter the proportion of incident light that is spatially-modulated according to the hologram by the SLM. The remaining proportion of the incident light is unmodulated and contributes to the zero order spot known as the "DC spot" as described herein. Thus, by changing the proportion of incident light that is spatially-modulated by the SLM it is possible to alter the intensity of the corresponding holographic reconstruction, since the hologram redirects only the spatially-modulated component of the incident light.

When calculating a computer-generated hologram for display by a holographic display device as described herein, the value of each hologram pixel is restricted to one of a plurality of allowable light modulation levels. The allowable light modulation levels (also known as "grey levels") are defined in a quantisation scheme.

One technique that may be used to alter the proportion of incident light that contributes to the zero order/DC spot, and thus the proportion of incident light that is spatially-modulated by the SLM, is to change the allowable light modulation levels. The allowable modulation levels may be represented as vectors as a plot on the complex plane. The step of "quantising" (described above) may also be referred to as "constraining" because the calculated values are effectively constrained to allowable values. In the case of phase-only holography, the plurality of allowable modulation levels is a plurality of allowable phase values (having unity amplitude) on a circle in the complex plane. It may be said that the number of modulation levels used to encode the hologram is changed (e.g. based on or a function of) the detected viewing position.

Figure 10:
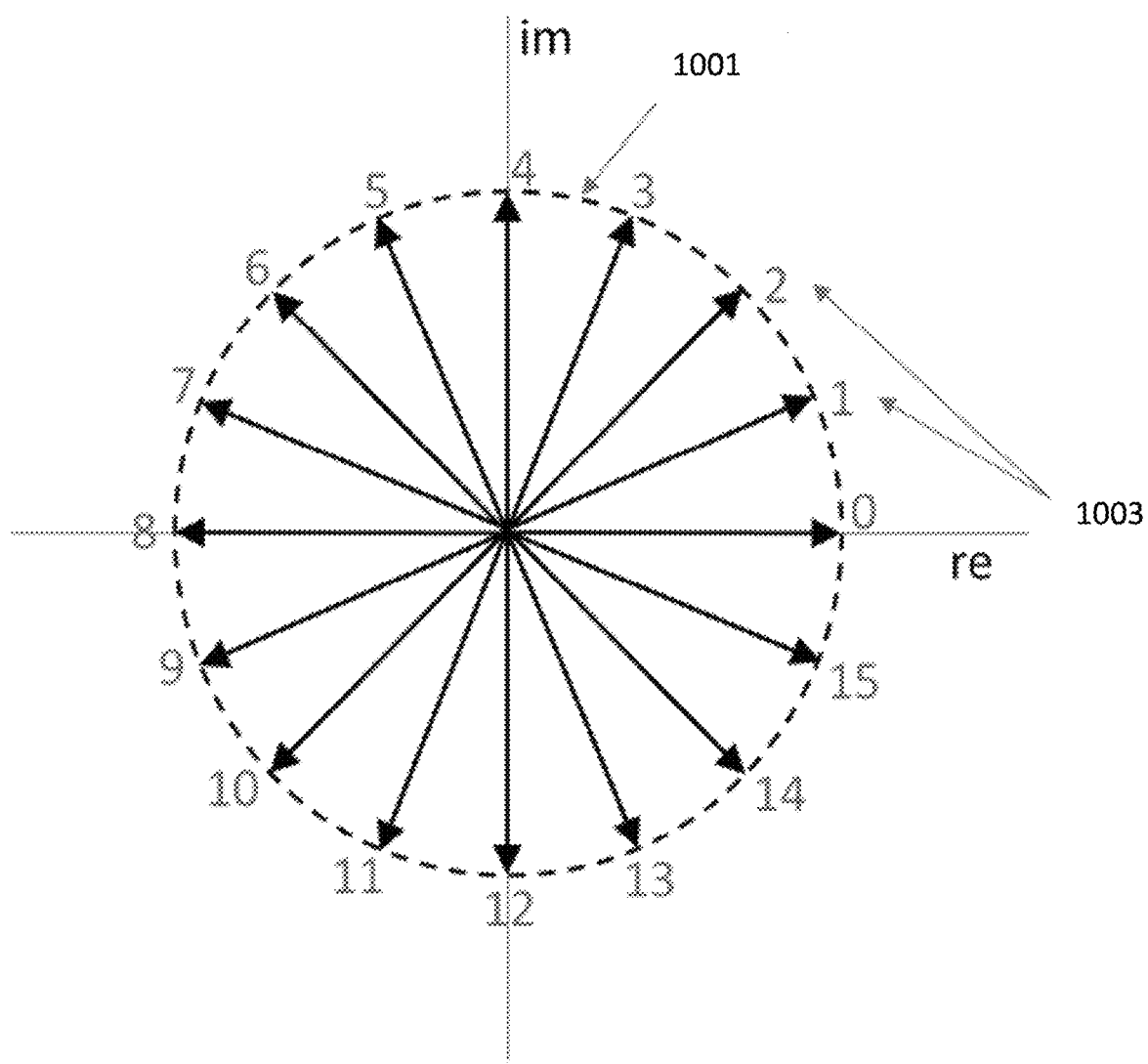
FIG. 10 illustrates an evenly distributed set of allowable phase/modulation levels plotted over a range 0 to $2\pi$ in the complex plane.

FIG. 10 shows an example of a typical quantisation scheme comprising a plurality of allowable light modulation levels. In particular, FIG. 10 shows an evenly distributed set of allowable light modulation levels plotted over a range 0 to $2\pi$ in the complex plane.

As described above with reference to FIGS. 2A to 2C, a hologram computed using a Fourier transform comprises a 2D array of complex numbers, and, in the case of phase-only holography, each complex number is converted into an allowable modulation level (or grey level) by setting the amplitude component to unity and quantising the phase value in accordance with one of the grey levels, which may be represented on the pixels of the spatial light modulator (as in processing block 253 of FIG. 2A).

FIG. 10 shows an example with 16 allowable modulation levels 1003 (labelled 0 to 15), represented as vectors on a unity amplitude phase circle 1001 in the complex plane in a "balanced" hologram, as described further below. Although in principle the quantisation points may be randomly distributed around the unity amplitude phase circle of FIG. 10, it is found that the best quality holographic images are obtained when the quantisation points are evenly distributed.

Accordingly, in the example of FIG. 10, in the quantisation step, each calculated complex number of the array of complex numbers of a computed hologram is allocated to one of the allowable modulation levels 0 to 15. For example, any mathematical approach—such as using a bank of comparators—may be used to identify the allowable modulation level which is closest to the calculated complex value in the complex plane.

Conventionally, for good quality holographic images in phase-only holography, a full $2\pi$ of allowable phase values is used as the range of allowable phase values. That is, the allowable phase value (e.g. 0 to 15 in FIG. 10) should span $2\pi$ in the complex plane. This approach minimises the zero order undiffracted/unmodulated light, which represents undesirable "optical noise" in the holographic images, as discussed above. In contrast, embodiments of the present disclosure may dynamically reduce or "truncate" the range of allowable phase values in an "unbalanced" manner, in order to increase the zero order undiffracted/unmodulated light, and thus decrease the optical power of the spatially modulated light. Decreasing the optical power of the spatially modulated light that decreases the intensity of the displayed image.

In particular, the holographic controller 602, 902 may dynamically compute a single colour hologram (or change a pre-computed hologram) encoded on the SLM 640, 940, so as to change the distribution and/or range of allowable phase values in response to feedback from the closed-loop feedback system. This may be achieved in various ways. For example, during real time hologram calculation, holographic controller 602, 902 may dynamically change the range of allowable modulation levels in order to dynamically change (decrease or increase) the proportion of output light from SLM 640, 940 corresponding the spatially modulated light forming the holographic reconstruction. In another example, holographic controller 602, 902 may adjust the weights the hologram values using a weighting or scaling factor after calculation of the hologram. In particular, holographic controller 602, 902 may multiply each of the quantised phase values by a scaling factor to reduce the range of allowable phase values (e.g. multiplying each of the quantised phase values by ½ will reduce the range from 0 to $2\pi$ to 0 to $\pi$). In another example, holographic controller 602, 902 may change the mapping of allowable modulation levels (i.e. grey levels) to voltage for the pixels of the SLM 640, 940. In particular, a look-up table (LUT) may be used to correlate each grey level to an analogue voltage (if the device has an analogue backplane) or a so-called bit-plane sequence (if the SLM has a digital backplane). The values in the LUT may be manipulated to provide a reduced range of phases. In another example, holographic controller 602, 902 may change the distribution of phase values within the range 0 to 2n (or a more limited range) to provide an uneven distribution. For example, the spacing between allowable modulation levels (e.g. phase values) may be dependent upon the modulation level (e.g. phase). In another example, each of the allowable modulation levels may be limited by a bin size, which may be dependent upon the modulation level. These and further examples are described in more detail below.

The allowable modulation levels 1003 shown in FIG. 10 are evenly distributed around the origin of the phase circle. There is no net effect of all the vectors represented in FIG. 10 when added together. In this arrangement, it may be said that the modulation scheme is "balanced". Accordingly, references herein to: "a balanced hologram", "a balanced modulation scheme" and "a balanced system" mean that the sum of the vectors representing the allowable modulation levels for the hologram, modulation scheme or holographic system is zero. Conversely, references to: "an unbalanced hologram", "an unbalanced modulation scheme" and "an unbalanced system" mean that the corresponding vector sum is non-zero.

It is found that phase retrieval algorithms (such as those based on the Gerchberg-Saxton algorithm) inherently balance use of the modulation levels of the hologram. That is, the grey levels are equally used. When the modulation scheme and hologram are balanced, the system is said to be balanced. That is, if the complex value of each hologram pixel were represented by a vector in the complex plane, the sum of all the vectors would be zero. Accordingly, in a balanced system implementing a balanced modulation scheme as illustrated by FIG. 10 and hologram calculation using the Gerchberg-Saxton algorithm, the intensity of the zero order unmodulated light (i.e. DC spot) is minimised.

Figure 11:
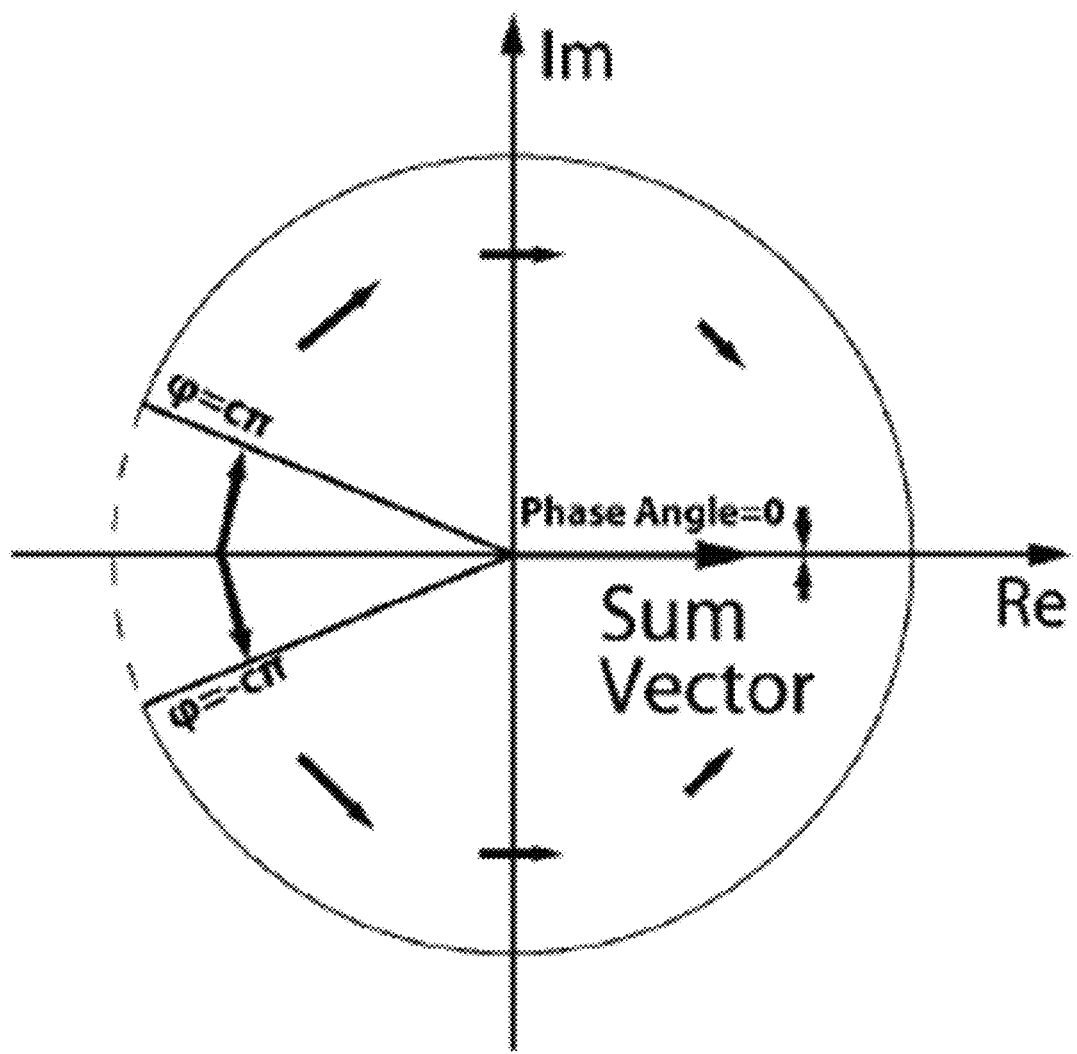
FIG. 11 illustrates a sum vector of the all available modulation levels of an allowable set of phase modulation levels.

Accordingly, by dynamically changing the hologram encoded on a phase-only LCOS SLM to have different distributions of allowable phase values, it is possible to "unbalance" the system in order to change (increase/decrease) the intensity of the zero order unmodulated light and thus the intensity of the spatially modulated light forming the holographic reconstruction. In particular, the intensity of the spatially modulated light can be reduced by changing from a balanced system, in which the vector sum of the hologram pixels is zero, to an unbalanced system, in which the vector sum of the hologram pixel values is non-zero and so represents the DC spot as shown in FIG. 11.

Unbalancing the system could be achieved in the number of ways, for example by unbalancing the modulation scheme and/or by unbalancing the hologram.

Unbalanced Truncation of the Phase Circle

Figure 12A:
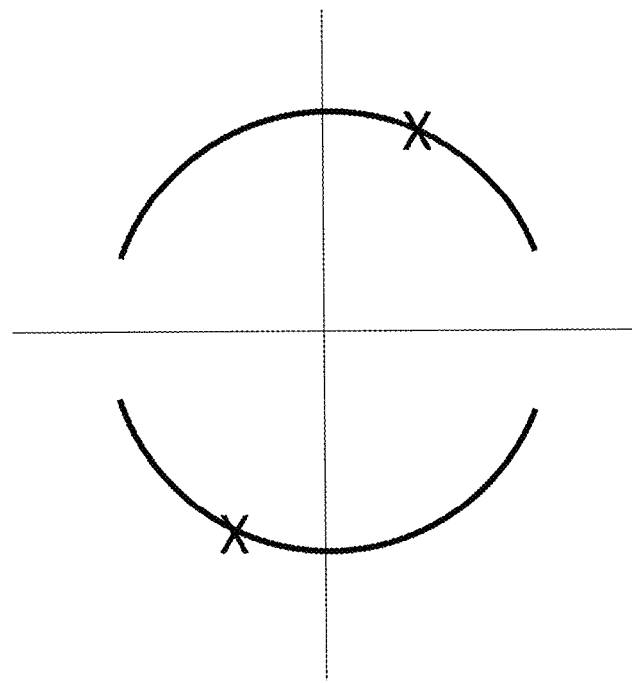
FIG. 12A illustrates a truncated range of an allowable set of phase modulation levels, similar to FIG. 10, with balanced truncation.

In some embodiments implementing phase holograms, unbalanced "truncation" of the phase circle for the allowable modulation levels could be used. As described above, conventionally in phase-only holography, a full $2\pi$ of allowable phase values are required to achieve good quality holographic images. That is, the allowable phase values (e.g. the grey levels 0 to 15 in FIG. 10) should span $2\pi$ in the complex plane. If the range of allowable phase values is decreased from $2\pi$, the phase circle is said to be "truncated". If the hologram pixel values still sum to zero in the complex plane, it may be said that we have "balanced truncation". An example of balanced truncation is shown in FIG. 12A. The arcs of the phase circle indicated by solid lines in FIG. 12A represent regions used for the allowable phase values, and the arcs indicated by dotted lines are the truncated regions where phase values are not allowed. When the truncation is balanced, each and every allowable modulation level on the phase circle has an equal and opposite point on the diametrically opposite side of the phase circle, as shown for example by the pair of points marked "X" in FIG. 12A. In particular, the pair of points marked X in FIG. 12A have equal and opposite real and imaginary components. However, when the truncation is balanced, as in FIG. 12A, the zero order undiffracted/unmodulated light is minimised in the same way as the conventional $2\pi$ range of allowable phase values because the sum vector is still zero.

Figure 12B:
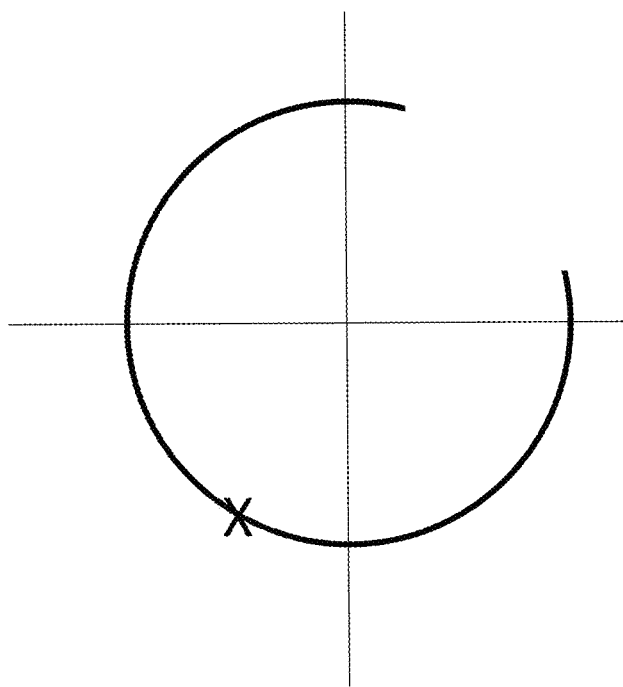
FIG. 12B illustrates a truncated range of an allowable set of phase modulation levels, similar to FIG. 12A, with an unbalanced truncation.

Accordingly, "unbalanced" truncation is required to generate a non-zero sum vector. An example of unbalanced truncation is shown in FIG. 12B. It can be seen that some modulation levels on the phase circle (e.g. at the point marked "X" on the solid arc), do not have an equal and opposite modulation level on the other side of the phase circle (since the point diametrically opposite to point X on the phase circle falls within the dotted arc). Thus, with an unbalanced distribution of allowable phase values as illustrated in FIG. 12B, the sum vector is non-zero and the intensity of the zero order undiffracted/unmodulated light (i.e. DC spot) is increased. In consequence, the intensity of the spatially modulated light and thus the holographic reconstruction is reduced.

By dynamically changing the unbalanced truncation, it is possible to dynamically change the intensity of the spatially modulated light used to form the holographic reconstruction. In particular, in embodiments, the holographic controller 602, 902 may dynamically compute holograms in real time (or change pre-computed holograms) encoded on the SLM 640, 940, so as to provide an unbalanced distribution or range of allowable phase values (i.e. grey levels) in real time. The extent to which the grey levels are unbalanced, in turn, determines the proportion of the incident light contributing to the zero order spot.

As the skilled person will appreciate, unbalanced truncation may be achieved in various ways, which, either manipulate the hologram data after or during calculation thereof, or unbalance the modulation scheme (change the distribution of allowable phase values), by voltage conversion or otherwise.

Accordingly, in embodiments, the holographic controller 602, 902 may recalculate the first/second hologram in response to the viewing position determined by the viewer-tracking system and/or in response to the closed-loop feedback system. In particular, the first/second hologram is recalculated by changing the quantisation scheme in order to change the proportion of light contributing to the zero-order spot of the holographic reconstruction, and thus the proportion of light that is spatially modulated and contributes to the first/second picture (or image). As described above, changing the quantisation scheme may comprises reducing the light modulation range within which the allowable light modulation levels are distributed. For example, changing the quantisation scheme may comprise changing the vector sum of the vectors representing the allowable light modulation levels on the complex plane.

Head-Up Display

Commercially-viable displays for the automotive industry are proposed using dynamic spatial light modulators including phase modulators. The main advantages of phase modulation are light efficiency and fault tolerance.

Figure 13:
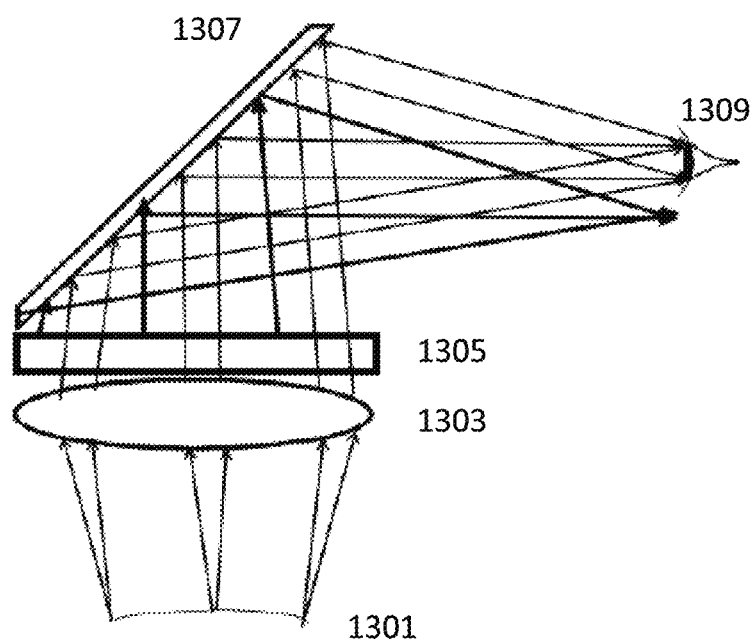
FIG. 13 illustrates virtual image formation in a head-up display using a pupil expander and optical combiner such as windscreen.

FIG. 13 show a system for forming a virtual image using the pupil expander 1305 of the present disclosure. The physical extent of the holographic replay field 1301 is limited by the maximum diffraction angle, $\theta m$, of the SLM. Associated with each point in the replay field 1301 is a pencil of rays, which diverges with angle, $\phi$, and of which the chief ray also diverges. In Fourier holographic replay, the angle, $\phi$, gives the field of view (FOV) of the reconstruction. A small FOV is a correlate of a large replay field size. The angle of the chief rays is determined by the curvature of the replay field. A projection optic 1303 (e.g. lens or powered mirror) is used to view a virtual image of the replay field

1301 at a large distance (e.g. 2 m, 5 m, 15 m, etc). This is illustrated in FIG. 13. The combiner 1307 shown in FIG. 13 is typically the windscreen of the car. If the chief ray from each ray pencil is projected back, they will meet at a distance from the lens, u, determined by the curvature of the replay field surface. The eye pupil placed at a distance, v, from the projection lens 1303, where v is given by the lens equation, will view the complete image. The FOV is now the total field subtended at the eye pupil 1309 in FIG. 13.

In addition to viewing the complete image, it is essential that the driver be able to move his/her head around within a limited area at the designed distance, v. In the automotive industry, this is known as the eye motion box (EMB)—but referred to more generically herein as the viewing window. In order to be able to keep looking at the complete image as the eye moves around the EMB, the pupil expander 1305 is employed. The pupil expander 1305 enlarges the EMB due to the generation of extra rays by division of amplitude of the incident wavefront as described above. The extra rays augment the visual field directly below the eye. A further consequence is that a larger image size can be supported and, hence, a larger FOV.

The Applicant has fabricated waveguides based on glass and air cavities to function as the pupil expander. The uniformity of the expansion can be tailored using either graded reflectors or tailored diffraction gratings on the surface of the waveguide or in the bulk. Alternative technologies may be used for the pupil expander. For example, microlens arrays that result in a virtual image location which is close behind the expander. The main virtue of a HUD including the display device of the present disclosure is the reduction of eye focus correction between the virtual image and the road viewed by the driver.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the detector is a photodetector such as a photodiode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In embodiments, only the primary replay field is utilised and system comprises physical blocks, such as baffles, arranged to restrict the propagation of the higher order replay fields through the system.

In the above described embodiments, the holographic reconstruction is a composite colour image. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A display device arranged to form a first picture and second picture that are visible at all viewing positions within a viewing window, the display device comprising:
   a picture generating unit arranged to output first spatially-modulated light of a first colour and second spatially-modulated light of a second colour, wherein the first spatially-modulated light corresponds to the first picture and the second spatially-modulated light corresponds to the second picture, wherein the picture generating unit comprises a controller arranged to control the first spatially-modulated light and the second spatially-modulated light,
   a waveguide pupil expander comprising:
      an input port arranged to receive the first spatially-modulated light and the second spatially-modulated light from the picture generating unit;
      a viewing surface for output to of the first spatially modulated light and the second spatially modulated light to the viewing window within which the first picture and the second picture are viewable; and
      a pair of parallel reflective surfaces arranged to guide the first spatially-modulated light and the second spatially-modulated light from the input port to the viewing surface by a series of internal reflections therefrom, wherein a reflectivity of a first reflective surface of the pair of parallel reflective surfaces is provided by a graded coating that is partially transmissive to light of the first colour and light of the second colour, wherein a transmissivity of the graded coating is non-achromatic, and
   a viewer-tracking system arranged to determine a viewing position within the viewing window,
   wherein the controller is arranged to change a brightness of the first and/or second spatially-modulated light based on the viewing position determined by the viewer-tracking system.

2. A display device as claimed in claim 1 wherein the first/second picture are formed by holographic reconstruction of a first/second hologram of the first/second picture and the controller is arranged to maintain as substantially constant a relative brightness of the first and second picture as seen from the viewing position by changing/recalculating the first/second hologram in response to the viewing position determined by the viewer-tracking system.

3. A display device as claimed in claim 2 wherein a value of each hologram pixel is restricted to one of a plurality of allowable light modulation levels in accordance with a quantisation scheme and recalculating the first/second hologram comprises changing the quantisation scheme in order to change a proportion of light contributing to a zero-order spot of the holographic reconstruction.

4. A display device as claimed in claim 3 wherein changing the quantisation scheme comprises reducing a light modulation range within which the allowable light modulation levels are distributed.

5. A display device as claimed in claim 3 wherein changing the quantisation scheme comprises changing a vector sum of the vectors representing the allowable light modulation levels on a complex plane.

6. A display device as claimed in claim 1 wherein the first/second spatially-modulated light received by the waveguide pupil expander from the picture generating unit comprises spatially-modulated light encoded with a first/second hologram corresponding to the respective first/second picture.

7. A display device as claimed in claim 6, wherein the controller is further arranged to change the brightness of the first and/or second spatially-modulated light in order to maintain as substantially constant in time a relative brightness of the first and second picture as seen from the viewing position.

8. A display device as claimed in claim 1 wherein the first/second spatially modulated light received by the waveguide pupil expander is light of the first/second picture, wherein the first/second picture is formed on an intermediate plane between the picture generating unit and viewing window, optionally, wherein the plane comprises a screen such as a diffuser arranged to display the first/second picture.

9. A display device as claimed in claim 8 wherein the first/second picture are formed on the intermediate plane by holographic reconstruction of a first/second hologram displayed by the picture generating unit.

10. A display device as claimed in claim 9 wherein holographic reconstruction of the first/second hologram forms, on the intermediate plane, a first/second picture area containing the first/second picture and a first/second non-picture area containing first/second non-picture content, wherein the display device further comprises a closed-loop feedback system including a first/second light detector arranged to measure a brightness of the first/second non-picture area.

11. A display device as claimed in claim 10 wherein the picture generating unit comprises a first/second light source arranged to illuminate the first/second hologram in order to form the first/second picture on the intermediate plane by holographic reconstruction, wherein the controller is arranged to apply a primary drive signal correction to a drive signal of the first/second light source based on the brightness measured by the first/second light detector.

12. A display device as claimed in claim 11 wherein the controller is arranged to apply a secondary drive signal correction to the drive signal of the first/second light source, wherein the secondary drive signal correction is a function of viewing position within the viewing window.

13. A display device as claimed in claim 11 wherein the primary and/or secondary drive signal correction is a correction to a voltage of the drive signal or a correction to an on-off temporal gating of the drive signal.

14. A method for displaying a first and second picture within a viewing window, the method comprising:
   outputting first spatially-modulated light of a first colour, wherein the first spatially-modulated light corresponds to the first picture;
   outputting second spatially-modulated light of a second colour, wherein the second spatially-modulated light corresponds to the second picture;
   receiving, at an input port of a waveguide pupil expander, the first spatially-modulated light and the second spatially-modulated light;
   guiding, between a pair of parallel reflective surfaces of the waveguide pupil expander, the received light to a viewing surface for output to of the first spatially modulated light and the second spatially modulated light to the viewing window, wherein the reflectivity of a first reflective surface of the pair of parallel reflective surfaces is provided by a graded coating that is partially transmissive to light of the first colour and light of the second colour, wherein the transmissivity of the graded coating is non-achromatic;

outputting, by the first reflective surface of the waveguide pupil expander, the received light to the viewing window to form/display the first picture and the second picture;

determining a viewing position, or change in the viewing position, within the viewing window of a viewer, and changing a brightness of the first and/or second spatially-modulated light based on the determined viewing position.

15. A method as claimed in claim 14 further comprising calibrating, for light of each of the first and second colours, the change in brightness required for maintaining substantially constant brightness of light output to the viewing window according to viewing position, optionally, measuring a relative brightness of each of the first and second pictures at a plurality of different viewing positions within the viewing window.

16. A method as claimed in claim 14 wherein changing the brightness of the first and/or second spatially-modulated light based on the determined viewing position comprises one or more of:

changing a drive signal to a light source corresponding to the first and/or second spatially-modulated light;

recalculating a hologram used for outputting the first and/or second spatially modulated light so as to change the proportion of light from a light source redirected by the hologram.

* * * * *